United States Patent
Fukui et al.

(10) Patent No.: US 9,957,655 B2
(45) Date of Patent: May 1, 2018

(54) LAUNDRY TREATING APPARATUS

(71) Applicant: LG Electronics Inc., Seoul (KR)

(72) Inventors: Ikuma Fukui, Gyeongnam (KR);
Masahito Shimono, Gyeongnam (KR);
Yongsu Kim, Gyeongnam (KR)

(73) Assignee: LG Electronics Inc., Seoul (KR)

( * ) Notice: Subject to any disclaimer, the term of this patent is extended or adjusted under 35 U.S.C. 154(b) by 56 days.

(21) Appl. No.: 14/359,946

(22) PCT Filed: Apr. 24, 2013

(86) PCT No.: PCT/KR2013/003511
§ 371 (c)(1),
(2) Date: May 22, 2014

(87) PCT Pub. No.: WO2013/162282
PCT Pub. Date: Oct. 31, 2013

(65) Prior Publication Data
US 2015/0033804 A1    Feb. 5, 2015

(30) Foreign Application Priority Data

Apr. 24, 2012  (KR) .................. 10-2012-0042708
Oct. 30, 2012  (KR) .................. 10-2012-0121165
(Continued)

(51) Int. Cl.
*D06F 37/22*     (2006.01)
*F16C 32/04*     (2006.01)
(Continued)

(52) U.S. Cl.
CPC .............. *D06F 37/22* (2013.01); *D06F 23/02* (2013.01); *D06F 37/04* (2013.01); *D06F 37/225* (2013.01);
(Continued)

(58) Field of Classification Search
CPC ............................. D06F 37/22; F16C 32/0423
See application file for complete search history.

(56) References Cited

U.S. PATENT DOCUMENTS 2,704,231 A    3/1955  Emil
3,604,222 A    9/1971  Wutherich
(Continued)

FOREIGN PATENT DOCUMENTS

CN    1572957 A     2/2005
DE    19919947 A1   11/2000
(Continued)

OTHER PUBLICATIONS

Chinese Office Action dated Sep. 30, 2015, for Chinese Application No. 201380003892.4, with English Translation, 14 Pages.
International Search Report dated Oct. 7, 2013 for Application No. PCT/KR2013/003511, 2 pages.
European Search Report dated Jun. 15, 2015 for Application No. 13781705.2, 6 Pages.

*Primary Examiner* — Jason Ko
(74) *Attorney, Agent, or Firm* — Fish & Richardson P.C.

(57) ABSTRACT

The present invention relates to a laundry treating apparatus (100) including a cabinet (1) having an introduction opening (11) for placing in, and taking out laundry there through, a tub (2) in the cabinet (1) having a tub opening (21) in communication with the introduction opening (11), a dram (3) rotatably provided in the tub (2) to have a drum opening (31) in communication with the tub opening (21) for holding the laundry, and a drum supporter (H, L) for levitating the dram (3) within the tub (2) with repulsive force between a permanent magnet provided to the tub (2) and a permanent magnet provided to the drum (3).

7 Claims, 17 Drawing Sheets

(30) Foreign Application Priority Data

Jan. 17, 2013 (KR) ........................ 10-2013-0005302
Jan. 17, 2013 (KR) ........................ 10-2013-0005303

(51) Int. Cl.
| | | |
|---|---|---|
| *D06F 37/04* | (2006.01) | |
| *D06F 37/26* | (2006.01) | |
| *D06F 37/30* | (2006.01) | |
| *D06F 23/02* | (2006.01) | |
| *D06F 37/20* | (2006.01) | |

(52) U.S. Cl.
CPC ............ *D06F 37/269* (2013.01); *D06F 37/30* (2013.01); *F16C 32/0423* (2013.01); *D06F 37/206* (2013.01); *F16C 2340/00* (2013.01)

(56) References Cited

U.S. PATENT DOCUMENTS

| 6,861,778 | B2 | 3/2005 | Izraelev |
|---|---|---|---|
| 2004/0174079 | A1 | 9/2004 | Izraelev |

FOREIGN PATENT DOCUMENTS

| EP | 1 050 617 B1 | 8/2004 |
|---|---|---|
| IT | MI942489 A1 | 6/1996 |
| IT | MI1275691 A1 | 10/1997 |
| JP | 05146584 | 6/1993 |
| JP | 10043476 | 2/1998 |
| KR | 10-1993-0010163 | 10/1993 |
| KR | 10-2004-0084134 | 10/2004 |
| KR | 10-2006-0105966 A | 10/2006 |
| KR | 100662150 | 12/2006 |

(a)

(b)

(a)

(b)

(c)

(a)  (b)

(c)

(a)

(b)

(a)

(b)

(c)

(a)

(b)

(a)

(b)

(a)

(b)

(a)

(b)

(a)

(b)

LAUNDRY TREATING APPARATUS

TECHNICAL FIELD

The present invention relates to a laundry treating apparatus, and more particularly, to a laundry treating apparatus which can minimize vibration and noise.

BACKGROUND ART

A related art laundry treating apparatus is provided with a cabinet which forms an exterior appearance thereof, a tub mounted in the cabinet, a drum rotatably mounted in the tub for washing laundry, and a motor fixedly secured to the drum passed through the tub for rotating the drum.

The tub is supported by springs and dampers in the cabinet, wherein the springs are provided to connect an upper side of an inside of the cabinet to an upper side of an outside of the tub, and the dampers are provided to connect a bottom of the inside of the cabinet to a lower side of the outside of the tub.

Particularly, the dampers are configured to be coupled to both sides of the lower side of the tub with hinges for attenuating vibration being transmitted to the tub when the drum rotates, respectively.

In more detail, each of the dampers is provided with a cylindrical cylinder connected to one of the both sides of the lower side of the tub with the hinge, a cylindrical piston connected to the bottom of the cabinet with the hinge to be movable within the cylinders, and a damping pad attached to an outside circumference of the piston for making friction with an inside circumference of the cylinder.

However, despite of the dampers mounted to the tub, the related art laundry treating apparatus has a limitation in attenuating the vibration.

That is, the related art laundry treating apparatus has a structure in which the motor is fixedly secured to a rear of the tub, with the rotation shaft of the motor connected to the drum passed through the rear of the tub, resulting in transmission of the vibration from the drum and the motor to the tub when the drum rotates. There have been problems in that, though attenuated, the vibration transmitted to the tub thus may be transmitted to the cabinet, and the vibration of the tub and the vibration of the cabinet caused by rotation of the drum thus may be increased more when the drum rotates in a dynamically unbalanced state.

In a dynamically balanced state, entire centrifugal force and entire moment of a rotation body caused by the centrifugal force become zero with respect to a rotation axis when a rotation body rotates. A rigid body may maintain the dynamic balance if a mass distribution is uniform with respect to a center of the rotation axis.

Accordingly, the dynamic balance of the laundry treating apparatus may be understood to be a case in which a mass distribution of the laundry with respect to the rotation axis of the drum is within an allowable range when the drum is rotating (A case when the drum rotates while vibrating within the allowable range).

Opposite to this, a dynamically unbalanced state of the laundry treating machine may be a state in which the mass distribution of the laundry with respect to the rotation axis of the drum is not constant when the drum rotates, which is a case when the distribution of the laundry in the drum is not uniform.

DISCLOSURE

Technical Problem

To solve the problems, an object of the present invention is to provide a laundry treating apparatus which enables to separate a tub and a cabinet from a vibration system of the laundry treating apparatus.

Another object of the present invention is to provide a laundry treating apparatus which makes a drum levitated within a tub with magnetic force for reducing noise and vibration generated when the drum rotates.

Another object of the present invention is to provide a laundry treating apparatus which makes a drum to be rotated by magnetic force for reducing noise and vibration generated when the drum rotates.

Another object of the present invention is to provide a laundry treating apparatus which enables to maximize a volume of the tub in a cabinet that has a limited space.

Another object of the present invention is to provide a laundry treating apparatus which can prevent vibration of a tub from transmitting to a cabinet through a gasket provided for sealing the tub.

Another object of the present invention is to provide a laundry treating apparatus which does not require dampers connected between a cabinet and a tub for absorbing vibration of the tub.

Technical Solution

To achieve these objects and other advantages and in accordance with the purpose of the invention, as embodied and broadly described herein, a laundry treating apparatus includes a cabinet having an introduction opening for placing in, and taking out laundry therethrough, a tub in the cabinet having a tub opening in communication with the introduction opening, a drum rotatably provided in the tub to have a drum opening in communication with the tub opening for holding the laundry, and a drum supporter for levitating the drum within the tub with repulsive force between a permanent magnet provided to the tub and a permanent magnet provided to the drum.

The drum supporter may include a circumferential supporter for levitating the drum within the tub to make the drum movable in a radial direction with reference to a rotation axis of the drum within the tub.

The circumferential supporter may include a tub magnetic substance constructed of permanent magnets provided along a circumferential surface of the tub, and a drum magnetic substance constructed of permanent magnets provided to a circumferential surface of the drum to have repulsive force provided thereto from the tub magnetic substance.

The tub magnetic substance may be provided along the circumferential surface of the tub discontinuously, and the drum magnetic substance is provided along the circumferential surface of the drum, continuously.

The circumferential supporter may further include a magnetic force amplifier for increasing the repulsive between the tub magnetic substance and the drum magnetic substance, wherein the magnetic force amplifier may include a metal secured to an inside circumferential surface of the tub for supporting the tub magnetic substance, and a metal secured to an outside circumferential surface of the drum for supporting the drum magnetic substance.

The circumferential supporter may further include a vibration damper secured to the inside circumferential surface of the tub for providing elastic force to the tub magnetic substance.

The circumferential supporter may further include a vibration damper secured to the inside circumferential surface of the tub for providing elastic force to the tub magnetic substance, a first magnetic force amplifier secured to the vibration damper for supporting the tub magnetic substance and increasing the repulsive force between the tub magnetic substance and the drum magnetic substance, and a second magnetic force amplifier secured to an outside circumferential surface of the drum for supporting the drum magnetic substance and increasing the repulsive force between the tub magnetic substance and the drum magnetic substance.

The drum supporter may further include a longitudinal supporter for maintaining gaps between the drum and the tub formed in a length direction of the tub.

The longitudinal supporter may include a front supporter provided to a front side of the tub having the opening of the tub positioned therein, and a front side of the drum having the opening of the drum positioned therein for maintaining the gap between the front side of the tub and the front side of the drum with the magnetic force, respectively, and a rear supporter provided to a rear side of the tub, and a rear side of the drum for maintaining the gap between the rear side of the tub and the rear side of the drum with the magnetic force, respectively.

The longitudinal supporter may include a front supporter provided to either the front side of the tub having the opening of the tub positioned therein, or the front side of the drum having the opening of the drum positioned therein for maintaining the gap between the front side of the tub and the front side of the drum and rotatably supporting the front side of the drum, and a rear supporter provided to either the rear side of the tub, or the rear side of the drum for maintaining the gap between the rear side of the tub and the rear side of the drum and rotatably supporting the rear side of the drum.

The tub magnetic substance may include a first tub magnetic substance and a second tub magnetic substance provided to the inside circumferential surface of the tub or the outside circumferential surface of the tub spaced a predetermined distance from each other, and the drum magnetic substance includes a first drum magnetic substance and a second drum magnetic substance provided to the inside circumferential surface of the drum or the outside circumferential surface of the drum for having the repulsive force provided thereto from the first tub magnetic substance and the second tub magnetic substance.

At least one of the first tub magnetic substance and the second tub magnetic substance may include at least two permanent magnets of the same widths provided spaced by the width of the permanent magnet from each other, and each of the first drum magnetic substance and the second drum magnetic substance includes one permanent magnet.

At least one of the first drum magnetic substance and the second drum magnetic substance may include at least two permanent magnets of the same widths provided spaced by the width of the permanent magnet from each other, and each of the first tub magnetic substance and the second tub magnetic substance may include one permanent magnet.

Each of the first tub magnetic substance and the second tub magnetic substance may include two or more than two permanent magnets of the same widths provided spaced by the width of the permanent magnet from one another, and each of the first drum magnetic substance and the second drum magnetic substance may include two or more than two permanent magnets of the same widths provided spaced by the width of the permanent magnet from one another.

The first tub magnetic substance and the second tub magnetic substance may be provided projected from the inside circumferential surface of the tub, and the first drum magnetic substance and the second drum magnetic substance may be provided projected from the outside circumferential surface of the tub.

The tub magnetic substance may be provided such that magnetic force of the tub magnetic substance positioned below a horizontal line passing the rotation axis of the drum parallel to a bottom of the cabinet is stronger than the magnetic force of the tub magnetic substance positioned above the horizontal line.

The tub magnetic substance may be provided to a region of the tub positioned above the horizontal line and entire circumferential surface of the tub positioned below the horizontal line.

The tub magnetic substance may be provided along the circumferential surface of the tub, wherein the tub magnetic substance positioned below the horizontal line has a thickness thicker than a thickness of the tub magnetic substance positioned above the horizontal line.

The tub magnetic substance may be provided only to the circumferential surface of the tub positioned below the horizontal line passing the rotation axis of the drum parallel to the bottom of the cabinet.

The tub magnetic substance may be provided to be symmetry with reference to a vertical line passing the rotation axis of the drum vertical to the bottom of the cabinet, and has a length provided shorter than a length of the circumference of the tub positioned below the horizontal line.

The laundry treating apparatus may further include a motor positioned on an outside of the tub, a first driving unit magnetic substance coupled to a rotation shaft of the motor to position on the outside of the tub, and a second driving unit magnetic substance coupled to the drum to position in the tub for rotating the drum with attractive force or repulsive force the first driving unit magnetic substance provides thereto.

Advantageous Effects

The present invention can devise to provide a laundry treating apparatus which enables to separate a tub and a cabinet from a vibration system of the laundry treating apparatus.

The present invention can devise to provide a laundry treating apparatus which makes a drum levitated within a tub with magnetic force for reducing noise and vibration generated when the drum rotates.

The present invention can devise to provide a laundry treating apparatus which makes a drum to be rotated by magnetic force for reducing noise and vibration generated when the drum rotates.

The present invention can devise to provide a laundry treating apparatus which enables to maximize a volume of the tub in a cabinet that has a limited space.

The present invention can devise to provide a laundry treating apparatus which can prevent vibration of a tub from transmitting to a cabinet through a gasket provided for sealing the tub.

The present invention can devise to provide a laundry treating apparatus which does not require dampers connected between a cabinet and a tub for absorbing vibration of the tub.

DESCRIPTION OF DRAWINGS

The accompanying drawings, which are included to provide a further understanding of the invention, illustrate embodiments of the invention and together with the description serve to explain the principle of the invention.

In the drawings:

FIGS. 4A to 7C illustrate schematic views of structures of drum supporters provided to a laundry treating apparatus in accordance with a preferred embodiment of the present invention, respectively.

FIGS. 10 to 12B illustrate schematic views of structures of drum supporters (Circumferential supporters) provided to a laundry treating apparatus in accordance with another preferred embodiment of the present invention, respectively.

FIGS. 13 to 15B illustrate schematic views of structures of drum supporters (Longitudinal supporters) provided to a laundry treating apparatus in accordance with another preferred embodiment of the present invention, respectively.

BEST MODE

Reference will now be made in detail to the specific embodiments of the present invention, examples of which are illustrated in the accompanying drawings.

As far as there is no specific definition, all terms in the specification are the same with a general meaning of the term understandable by persons skilled in this field of art, and, if the term used in the specification conflicts with the general meaning of the term, the meaning of the term used in the specification prevails.

In the meantime, a configuration or a control method of a device described hereinafter is provided only for describing embodiments of the present invention, but not for limiting scope of patent rights of the present invention, and wherever possible, the same reference numbers will be used throughout the drawings to refer to the same or like parts.

Figure 1:
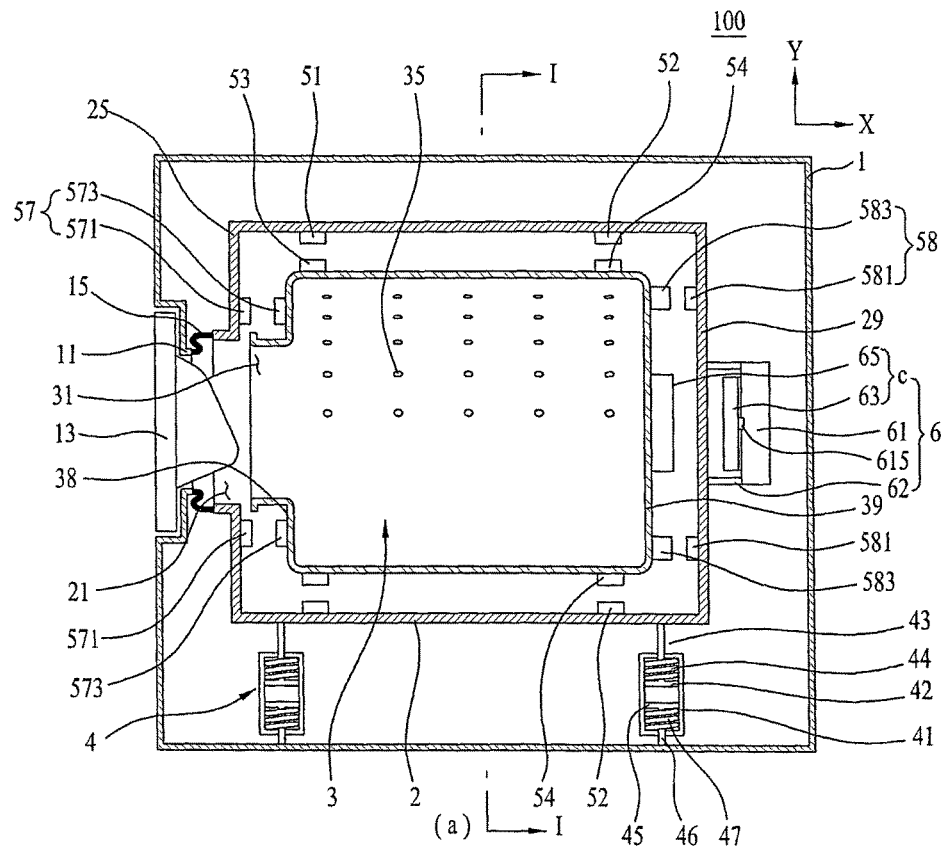
FIGS. 1A and 1B illustrate longitudinal sections each showing an exemplary laundry treating apparatus in accordance with a preferred embodiment of the present invention.
Figure 1:
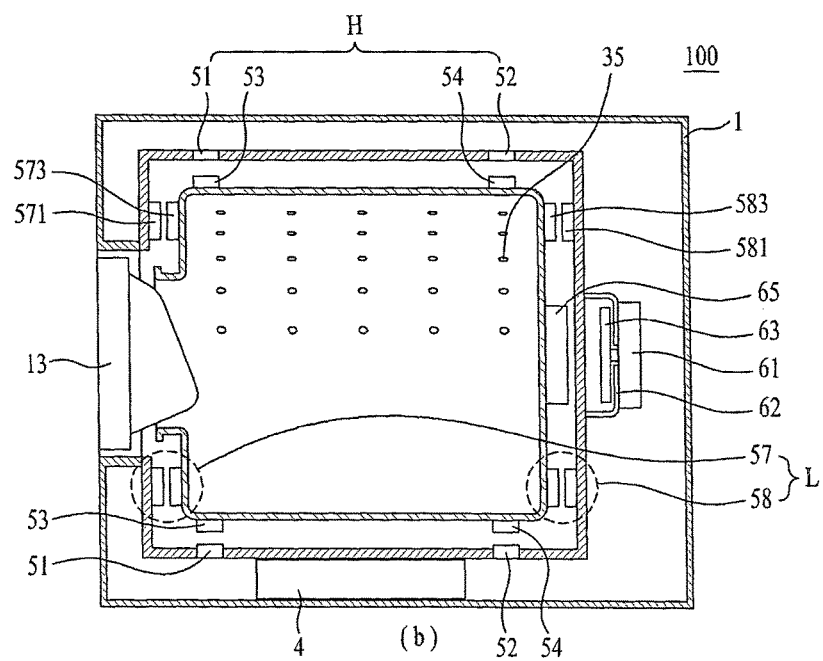

FIG. 1 illustrates a longitudinal section of an exemplary laundry treating apparatus 100 in accordance with a preferred embodiment of the present invention, including a cabinet 1 which forms an exterior appearance thereof, a tub 2 in the cabinet for holding washing water, and a drum 3 rotatably provided in the tub for holding laundry.

The cabinet 1 is provided with an introduction opening 11 to be opened/closed with a door 13 for introduction or taking out the laundry to/from the drum 3.

The tub 2 is an empty cylinder and has a front side 28 of the tub provided with a tub opening 21 in communication with the introduction opening 11. That is, the cylindrical tub 2 has the tub opening 21 in a side facing the door for enabling introduction/taking out the laundry.

In the meantime, if the laundry treating apparatus of the present invention is provided only for drying clothes, the tub 2 is means, not for holding the washing water, but for providing a space for housing the drum 3, as well as for securing drum supporters H, and L to be described later.

That is, if the laundry treating apparatus of the present invention is provided as a laundry treating apparatus for drying the clothes, the tub 2 may be provided to have a structure which can not hold the washing water as far as the tub 2 can house a circumferential surface of the drum and secure the drum supporters H, and L thereto.

The cabinet 1 may further include a gasket 15 positioned between the tub opening 21 and the introduction opening 11 for preventing the washing water from leaking from the tub, and transmission of vibration from the tub to the cabinet 1. Though it will be described later, the gasket 15 may not be provided to the laundry treating apparatus 100 of the present invention, without fail.

The drum 3 is rotatable in the tub with the drum driving unit 6 to be described later. The drum 3 has a drum opening 31 provided in a front side 38 of the drum to be in communication with the tub opening 21. Therefore, the user may introduce the laundry to the drum through the door 13, or take out the laundry from an inside of the drum to an outside of the cabinet by opening/closing the door 13.

The drum 3 has a plurality of pass through holes 35 in an outside circumferential surface thereof. Therefore, the washing water supplied to the tub 2 through a water supply unit (Not shown) may be supplied to the drum 3 through the pass through holes 35, and may be discharged from the inside of the drum to the tub 2 through the pass through holes 35.

The tub 2 is secured to an inside of the cabinet 1 with a tub supporter 4, for supporting the tub 2 by using repulsive force of magnetic force.

That is, the tub supporter 4 of the present invention may include an upper unit 42, 43 and 44 having either an N magnetic pole or an S magnetic pole, a lower unit 45, 46 and 47 having a magnetic pole identical the upper unit, and a cylinder 41 for housing the upper unit and the lower unit.

The upper unit may include an upper piston 42 to be movable in up/down directions within the cylinder 41, an upper rod 43 having one end secured to the tub 2 and the other end secured to the upper piston 42, and an upper coil 44 wound on the upper piston or the upper rod positioned in the cylinder for magnetizing the upper piston upon having a current supplied thereto.

The lower unit may include a lower piston 45 positioned to be movable in up/down directions within the cylinder, a lower rod 46 having one end secured to the cabinet 1 and the other end secured to the lower piston 45, and a lower coil 47 wound on the lower piston or the lower rod to be positioned in the cylinder for magnetizing the lower piston 45 upon having a current supplied thereto.

In this case, it is preferable that the upper coil 44 and the lower coil 47 are magnetized to have identical magnetic poles. Therefore, the tub 2 of the present invention can be supported within the cabinet 1 by the repulsive force between the upper piston 42 magnetized by the upper coil 44 and the lower piston 45 magnetized by the lower coil 47.

Alike the gasket 15 described before, the tub supporter 4 may also not be provided to the laundry treating apparatus of the present invention without fail, which will be described in detail, later.

In the meantime, the laundry treating apparatus 100 of the present invention further includes a drum supporter for levitating the drum 3 within the tub 3 with repulsive force between a magnetic substance provided to the tub and a magnetic substance provided to the drum.

The drum supporter may be a circumferential supporter H which makes the drum 3 to be levitated within the tub 2 in a height direction of the cabinet 1 (A height direction of the tub, a y-axis direction).

That is, the circumferential supporter H is means for enabling the drum 3 to float in a radial direction with reference to a rotation axis of the drum within the tub 2.

The circumferential supporter H may include a tub magnetic substance 51 and 52 provided to a circumferential surface of the tub 2, and a drum magnetic substance 53 and 54 provided to a circumferential surface of the drum 3 to have a magnetic pole identical to the tub magnetic substance 51.

Figure 2:
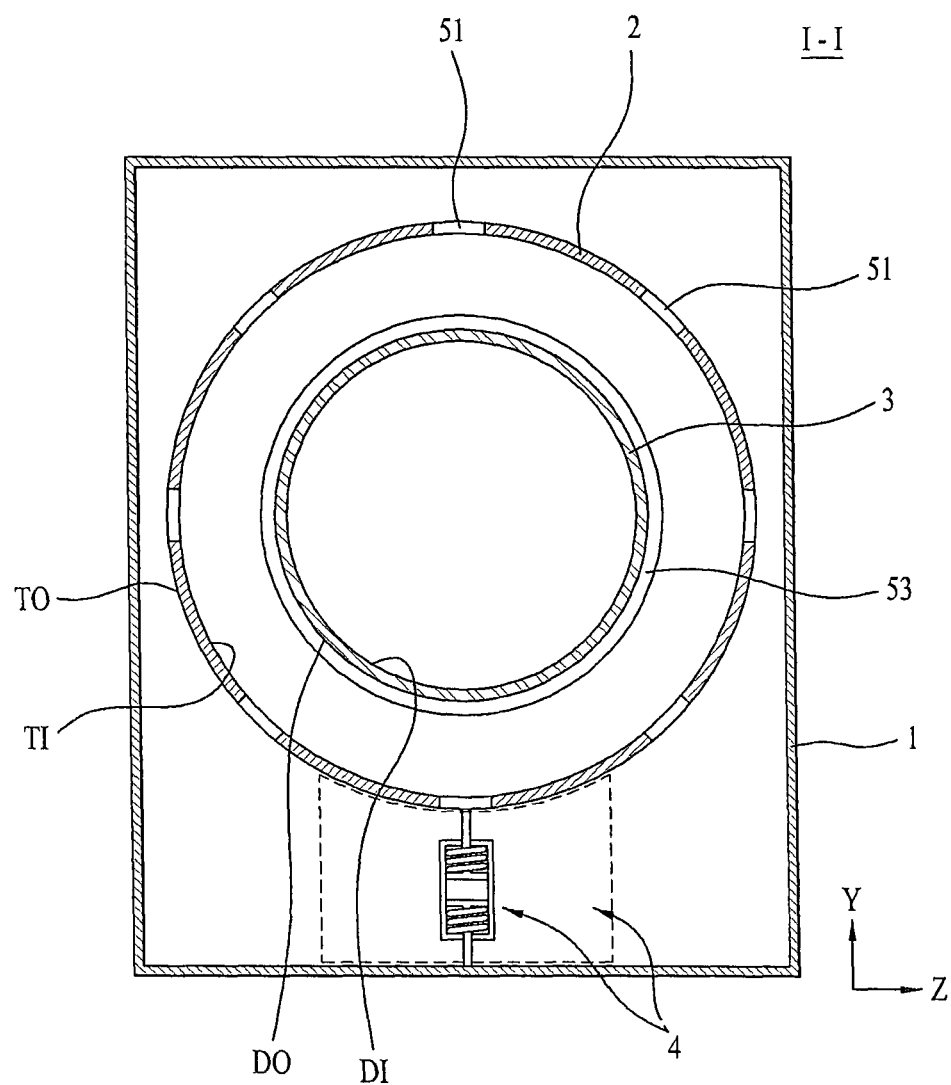
FIG. 2 illustrates a transverse section of a laundry treating apparatus in accordance with a preferred embodiment of the present invention.

The tub magnetic substance 51 and 52 and the drum magnetic substance 53 and 54 may be permanent magnets, wherein, as shown in FIG. 2, the tub magnetic substance 51 and 52 may be a permanent magnet with an N pole and an S pole provided to an inside circumferential surface TI or an outside circumferential surface TO of the tub 2, and the drum magnetic substance 53 and 54 may be a permanent magnet with an N pole and an S pole provided to an outside circumferential surface DO or an inside circumferential surface DI of the drum.

In any case, it is preferable that the tub magnetic substance 51 and 52 and the drum magnetic substance 53 and 54 are arranged to have identical magnetic poles thereof to face each other for levitating the drum 3 within the tub 2 by the repulsive force of the two permanent magnets.

In the meantime, the tub magnetic substance 51 and 52 and the drum magnetic substance 53 and 54 may be bar shaped permanent magnets secured to the circumferential surface of the tub and the circumferential surface of the drum, respectively.

However, referring to FIG. 2, one of the tub magnetic substance 51 and 52 and the drum magnetic substance 53 and 54 may be the bar shaped permanent magnet, and the other one of the tub magnetic substance 51 and 52 and the drum magnetic substance 53 and 54 may be a button shaped permanent magnet.

That is, if the tub magnetic substance 51 and 52 is provided along the circumferential surface of the tub 2 discontinuously, the drum magnetic substance 53 and 54 may be provided along the circumferential surface of the drum 3, continuously (See FIG. 2).

However, the tub magnetic substance 51 and 52 may be provided along the circumferential surface of the cylindrical tub 2 continuously, and the drum magnetic substance 53 and 54 may be provided along the circumferential surface of the drum 3, discontinuously.

If the tub magnetic substance 51 and 52 is provided along the circumferential surface of the tub 2 discontinuously, the tub magnetic substance 51 and 52 may be the button shaped permanent magnets provided along the circumferential surface of the tub at predetermined intervals. In the case, the tub magnetic substance 51 and 52 may be provided inserted in the circumferential surface.

The drum magnetic substance 53 and 54 provided continuously along the circumferential surface of the drum may be a band or bar shaped permanent magnet wound on the circumferential surface of the drum.

Moreover, the tub magnetic substance may be a plurality of magnetic substances 51 and 52 provided at predetermined intervals in a length direction (An x-axis direction) of the tub 2, and the drum magnetic substance 53 and 54 may be magnetic substances 53 and 54 of a number the same with the number of the tub magnetic substances provided at predetermined intervals in a length direction of the drum 3.

FIGS. 1A and 1B illustrate longitudinal sections showing exemplary laundry treating apparatuses in accordance with a preferred embodiment of the present invention, including the tub magnetic substance having a first tub magnetic substance 51 and a second tub magnetic substance 52, and the drum magnetic substance having a first drum magnetic substance 53 and a second drum magnetic substance 54.

In this case, the first tub magnetic substance 51 and the first drum magnetic substance 53 are respectively provided to the tub and the drum to have identical magnetic poles thereof to face each other, and the second tub magnetic substance 52 and the second drum magnetic substance 54 are respectively provided to the tub and the drum to have identical magnetic poles thereof to face each other, too.

According to this, the drum 3 in the laundry treating apparatus 100 of the present invention maintains a levitated state within the tub 2 so to be able to maintain a fixed gap between the outside circumferential surface of the drum 3 and the inside circumferential surface of the tub 2 with the circumferential supporter H.

In the meantime, referring to FIG. 1, the drum supporter may further include a longitudinal supporter L which makes the tub 2 and the drum 3 to maintain a gap in the length direction (The x-axis direction) of the cabinet 1.

The longitudinal supporter L may include a front supporter 57 for maintaining a gap between the front side 28 of the tub (A side the tub opening is provided therein) and the front 38 side of the drum (A side the drum opening is provided therein), and a rear supporter 58 for maintaining a gap between a rear side 29 of the tub and a rear side 39 of the drum.

The longitudinal supporter L may also be provided to maintain the gap between the tub and the drum with the repulsive force between the permanent magnets.

That is, the front supporter 57 may include a tub front magnetic substance 571 provided to the front side 28 of the tub, and a drum front magnetic substance 573 provided to the front side 38 of the drum for providing repulsive force to the tub front magnetic substance 571. It is preferable that the tub front magnetic substance and the drum front magnetic substance are provided to the front side of the tub and the front side of the drum with identical magnetic poles (N pole or S pole) thereof to face each other, respectively.

The tub rear supporter 58 may include a tub rear magnetic substance 581 provided to the rear side 29 of the tub, and a drum rear magnetic substance 583 provided to the front side 39 of the drum for providing repulsive force to the tub rear magnetic substance 581.

Accordingly, the laundry treating apparatus 100 of the present invention can prevent the front side or the rear side of the drum 3 from hitting the front side or the rear side of the tub 2 even if the drum 3 vibrates in the length direction (The x-axis direction) of the tub. (Even if the drum floats along the rotation axis of the drum, the drum is prevented from hitting the tub).

The drum 3 is rotated within the tub by the drum driving unit 6.

The drum driving unit 6 may include a motor 61 positioned at the rear side 29 of the tub, and a magnetic coupler C having a first driving unit magnetic substance 63 (Positioned on an outside of the tub) coupled to a rotation shaft 615 of the motor, and a second driving unit magnetic substance 65 (Positioned on an inside of the tub) secured to the drum for rotating the drum by attractive force or repulsive force the first driving unit magnetic substance 63 provides thereto.

Figure 3:
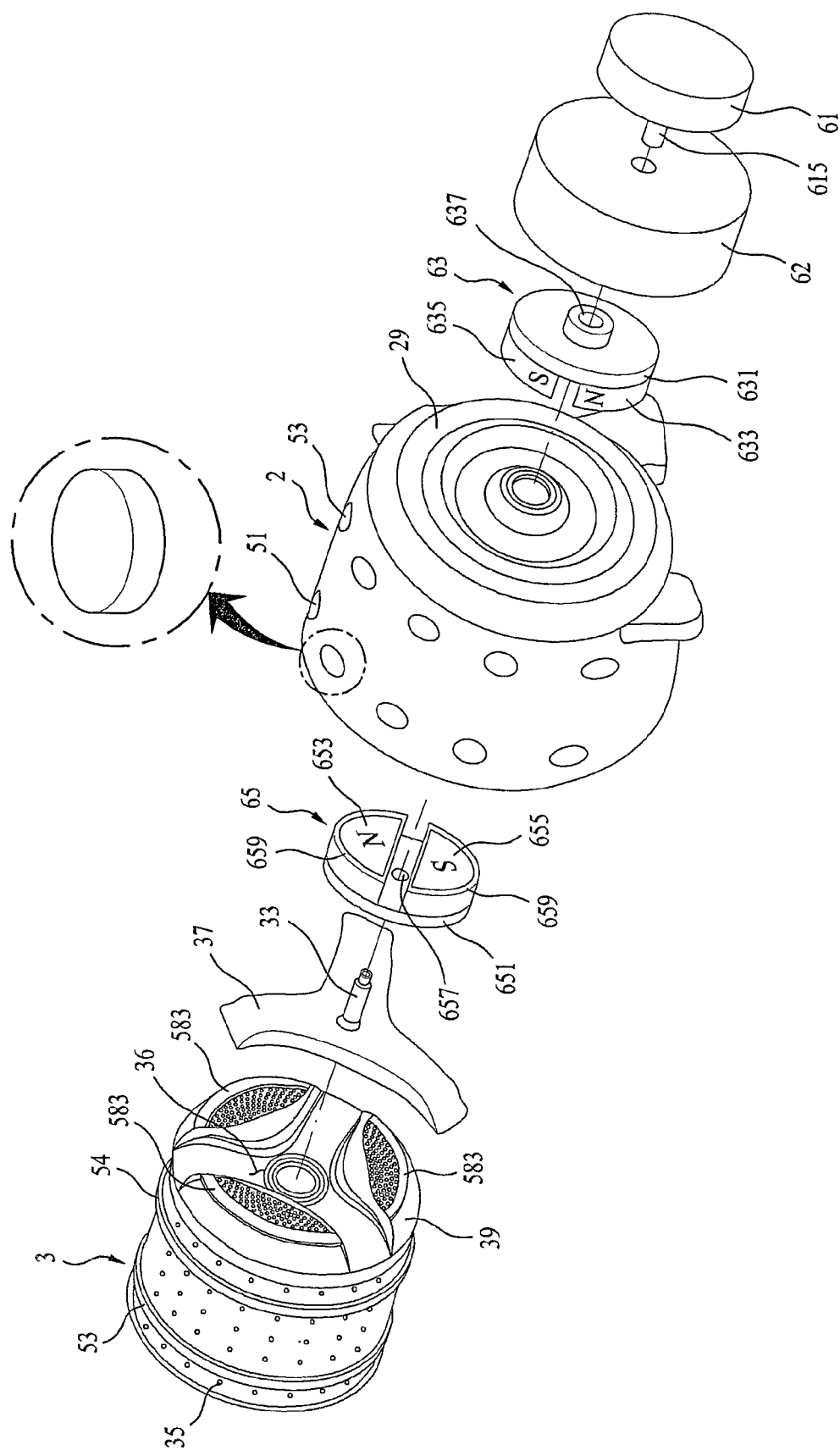
FIG. 3 illustrates an exploded perspective view of a drum, a tub and a drum driving unit provided to a laundry treating apparatus in accordance with a preferred embodiment of the present invention.
Figure 4:
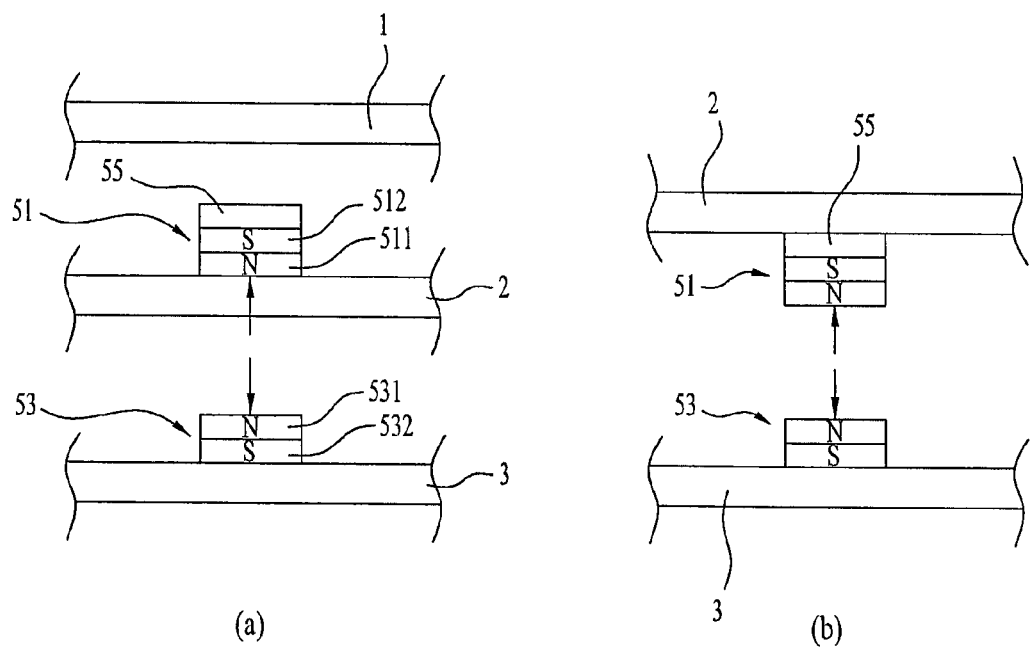
Figure 4:
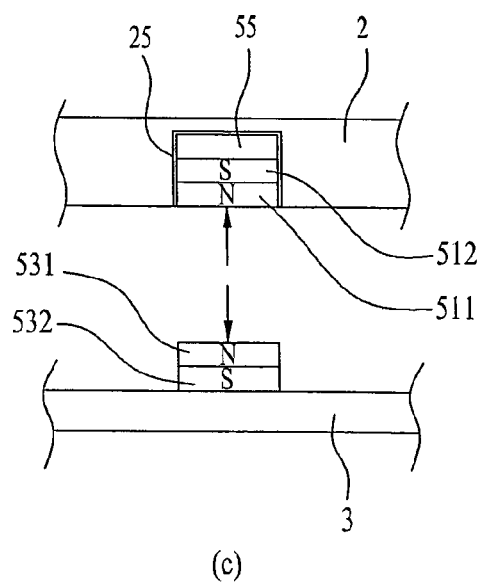
Figure 5:
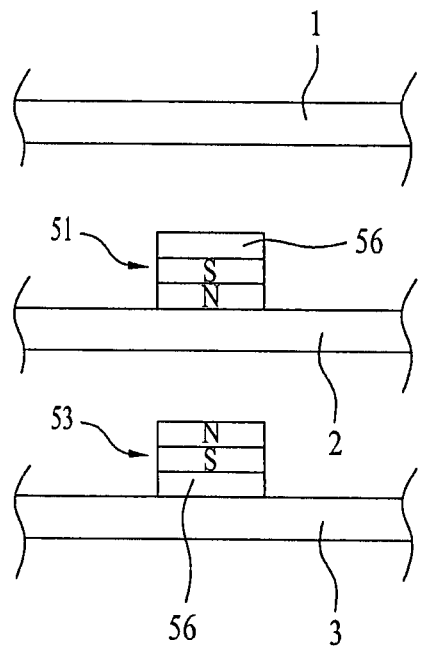
Figure 5:
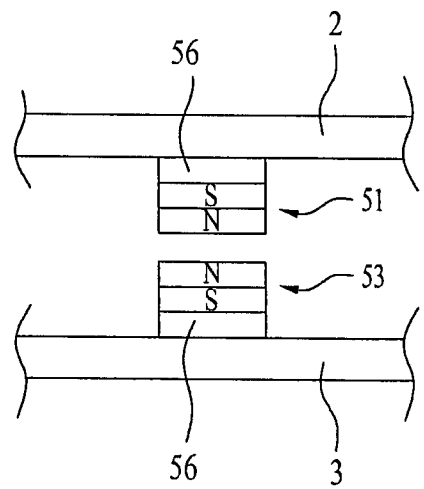
Figure 5:
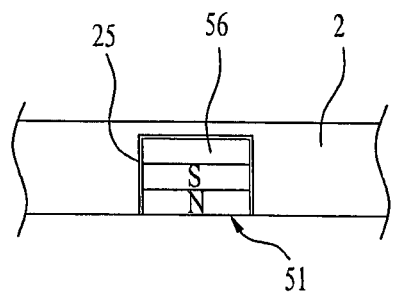
Figure 5:
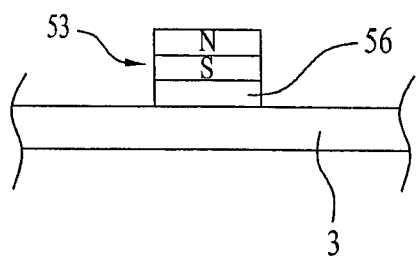

Referring to FIG. 3, the motor 61 is fixedly secured to the tub spaced a predetermined distance from the rear side 29 of the tub with a spacer 62.

The first driving unit magnetic substance 63 is positioned in a space between the rear side 29 of the tub and the spacer 62 secured to the rotation shaft 615 passed through the spacer 62, and the second driving unit magnetic substance 65 is secured to the rear side 39 of the drum.

Referring to FIG. 3, the spacer 62 has an opened cylindrical side facing the rear side 29 of the tub, the first driving unit magnetic substance 63 may be positioned in the spacer 62.

The first driving unit magnetic substance 63 may include a first base 631 having a first fastening hole 637 provided thereto for securing the rotation shaft of the motor 61 thereto, a first magnet 633 fixedly secured to the first base to expose one of N or S magnetic pole, and a second magnet 635 fixedly secured to the first base to expose a magnetic pole different from the first magnet.

In the meantime, the second driving unit magnetic substance 65 may include a second base 651 fixedly secured to the rear side of the drum 3, and a third magnet 653 and a fourth magnet 655 fixedly secured to the second base so as to expose magnetic poles different from each other.

When the drum 3 rotates by the attractive force between the first driving unit magnetic substance 63 and the second driving unit magnetic substance 65, it is required that the first magnet 633 and the fourth magnet 655 are provided to have magnetic poles different from each other, and the second magnet 635 and the third magnet 653 are also provided to have magnetic poles different from each other.

However, if the drum 3 rotates by the repulsive force between the first driving unit magnetic substance 63 and the second driving unit magnetic substance 65, it is required that the first magnet 633 and the fourth magnet 655 are provided to have identical magnetic poles, and the second magnet 635 and the third magnet 653 are also provided to have identical magnetic poles.

Moreover, each of the magnets 633, 635, 653, and 655 may have an insulating portion 659 provided thereto, additionally.

And, the drum 3 may have an arm 37 provided thereto additionally for easy transmission of the rotation force from the magnetic coupler C to the drum 3.

The arm 37 may be provided in three bar shapes extended in a radial direction from the drum rotation shaft 33. In this case, the rear side of the drum 3 may have an arm receiving groove 36 for securing the arm 37 thereto additionally, and the second base 651 may have a second fastening hole 657 for securing the drum rotation shaft 33 thereto, additionally.

If the first base 631 rotates by the rotation shaft 611 of the motor 61, the first magnet 633 and the second magnet 635 rotate, and if the first magnet 633 and the second magnet 635 rotate, since the third magnet 653 and the fourth magnet 655 rotate the second base 651 with attractive force, the drum 3 rotates within the tub 2.

In the meantime, since the gap between the drum 3 and the tub 2 is maintained by the longitudinal supporter L when the drum 3 rotates, bringing the rear side 39 of the drum into contact with the rear side 29 of the tub by the attractive force of the magnetic coupler C is prevented.

That is, the drum 3 of the laundry treating apparatus of the present invention rotates, not in direct coupling of the rotation shaft 611 of the motor 61 to the drum 3, but by the magnetic force between the first driving unit magnetic substance 63 and the second driving unit magnetic substance 65 which are not in contact with each other, with the rear side 29 of the tub disposed therebetween.

Since the laundry treating apparatus 100 having the foregoing structure has the vibration generated when the drum 3 rotates not transmitted to the tub 2 through the rotation shaft 615, the laundry treating apparatus 100 of the present invention has an advantage of providing a laundry treating apparatus of which vibration and noise is reduced.

Accordingly, since the laundry treating apparatus of the present invention can separate the tub 2 from the vibration system thereof, the gasket 15 and the tub supporter 4 described before may not be required to be provided, essentially.

That is, referring to FIG. 1B, the tub opening 21 may be provided to be directly connected to the introduction opening 11, and the tub supporter 4 may be provided as means, not for absorbing the vibration of the tub 2, but supporting the outside circumferential surface of the tub 2 on the bottom of the cabinet 1, merely.

And, since the gaps between the drum and the tub are maintained by the circumferential supporter H and the longitudinal supporter L that provide the magnetic force, the laundry treating apparatus 100 of the present invention can prevent the drum from hitting the tub or the drum from transmitting the vibration to the tub even if the drum 3 rotates in an unbalanced state (A state the laundry is concentrated at a region of the drum), thereby permitting to reduce the noise or the vibration compared to the related art laundry treating apparatus.

And, since the tub 2 can be separated from the vibration system of the laundry treating apparatus 100, the laundry treating apparatus 100 of the present invention permits to expect an effect of maximizing a volume of the tub 2 (Maximizing a washing capacity) for cabinets with the same volume.

Though it has been essential for the related art laundry treating apparatus to secure a space between the tub and the cabinet for preventing the drum from hitting the cabinet, since the foregoing structure of the laundry treating apparatus 100 of the present invention can minimize an amplitude of the vibration of the tub or separate the tub from the vibration system, the laundry treating apparatus 100 of the present invention can maximize the volume of the tub 2 for cabinets with the same volume.

In the meantime, the tub magnetic substance 51 and 52 and the drum magnetic substance 53 and 54 provided to the laundry treating apparatus 100 of the present invention can be fixedly secured to the tub and the drum in structures shown in FIGS. 4A to 7C, respectively.

Positional relation between the first tub magnetic substance 51 and the first drum magnetic substance 53, and structures in which the first tub magnetic substance 51 and the first drum magnetic substance 53 are coupled to the tub and the drum respectively are the same with the positional relation and the coupling structures of the second tub magnetic substance 52 and the second drum magnetic substance 54. Therefore, the positional relation, and the coupling structures of the first tub magnetic substance 51 and the first drum magnetic substance 53 will only be described for convenience's sake.

Referring to FIGS. 4A~4C, the first tub magnetic substance 51 may be fixedly secured to the outside circumferential surface (See FIG. 4A) of the tub 2, or to the inside circumferential surface (See FIGS. 4B and 4C). Though it is preferable that the first drum magnetic substance 53 is fixedly secured to the outside circumferential surface of the drum 3, the first drum magnetic substance 53 may be fixedly secured to the inside circumferential surface of the drum 3, or fixedly inserted in the circumferential surface of the drum 3.

However, in any case, it is required that the first tub magnetic substance 51 and the first drum magnetic substance 53 are arranged such that identical magnetic poles thereof (511 vs. 531, and 512 vs. 532) face each other.

In the meantime, when the drum rotates, the first tub magnetic substance 51 vibrates by repulsive force between the first drum magnetic substance 53 and the first tub magnetic substance 51, and the vibration of the first tub magnetic substance 51 is liable to make the tub 2 to vibrate. In order to prevent this, the circumferential supporter H may include a vibration damper 55.

Referring to FIG. 4A, the vibration damper 55 may be secured to the first tub magnetic substance 51 to position between the cabinet 1 and the first tub magnetic substance 51, or, as shown in FIG. 4B, may be provided to the inside circumferential surface of the tub 2 to support the first tub magnetic substance 51.

And, referring to FIG. 4C, if the first tub magnetic substance 51 is fixedly inserted in the circumferential surface of the tub 2, the vibration damper 55 may be provided to be inserted in the inside circumferential surface of the tub 2 to support the first tub magnetic substance 51.

That is, if the first tub magnetic substance 51 is placed in an insert hole 25 in the circumferential surface of the tub 2, the vibration damper 55 may be provided to an inside of the insert hole 25 to support the first tub magnetic substance 51.

If a distance between the first drum magnetic substance 53 and the first tub magnetic substance 51 becomes closer by the vibration of the drum 3, leading to increase the repulsive force (Strength of the magnetic force) of the first drum magnetic substance 53 and the first tub magnetic substance 51, it is liable that the tub 2 vibrates together with the drum 3 when the drum 3 vibrates.

However, since the first tub magnetic substance 51 is secured to the tub 2 by the vibration damper 55, the laundry treating apparatus 100 of the present invention can minimize transmission of the vibration from the drum 3 to the tub 2 even if the repulsive force between the first tub magnetic substance 51 and the first drum magnetic substance 53 increases (See FIGS. 4B and 4C).

In the meantime, if the vibration damper 55 is provided between the cabinet 1 and the first tub magnetic substance 51 (See FIG. 4A), the vibration damper 55 will serve to reduce the noise and the vibration occurred when the tub 2 hits the cabinet 1.

FIGS. 5A~5C illustrate schematic views of circumferential supporters H in accordance with another preferred embodiment of the present invention, having a magnetic force amplifier 56 provided thereto, additionally.

Figure 6:
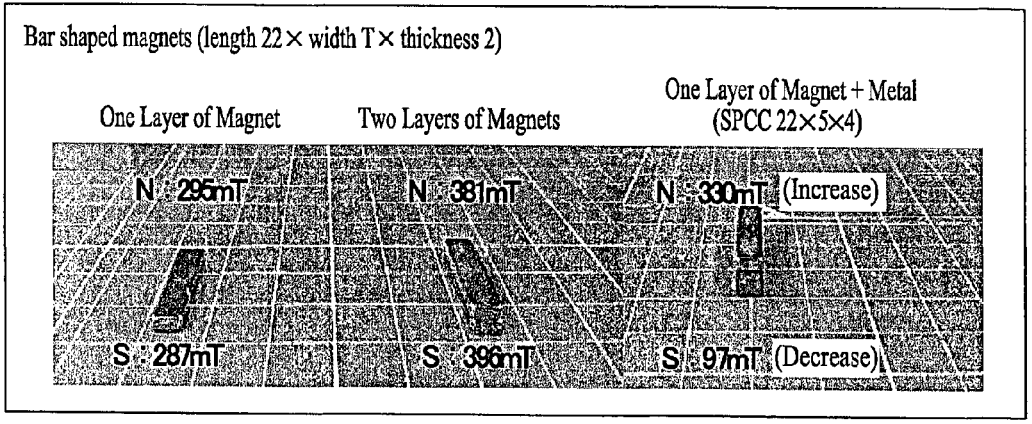
Figure 6:
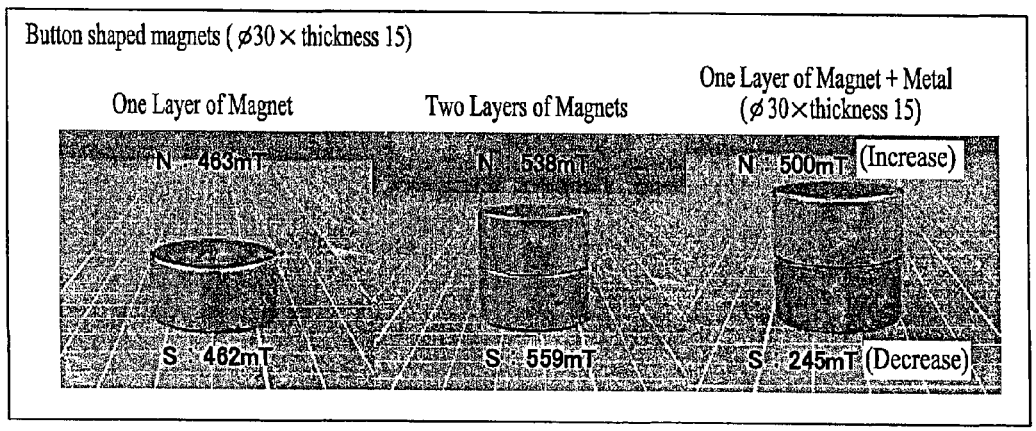
Figure 7:
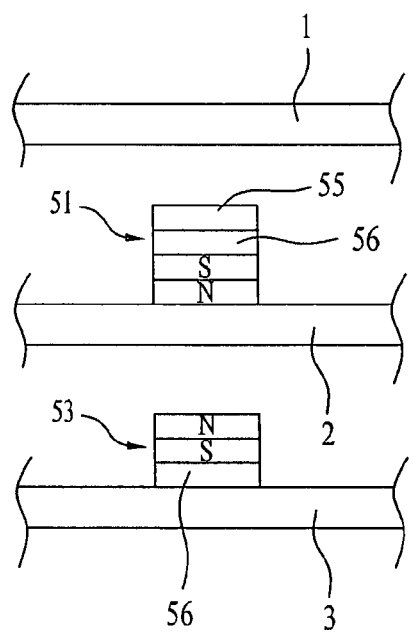
Figure 7:
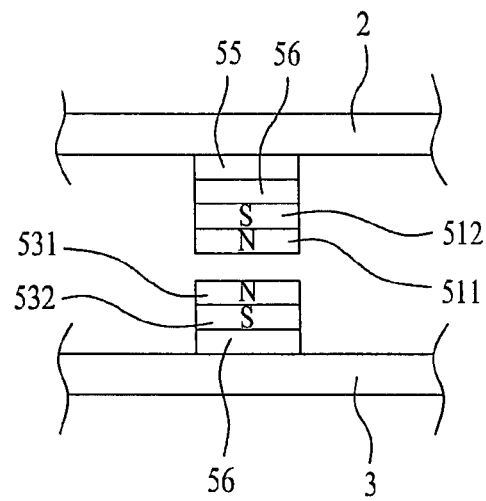
Figure 7:
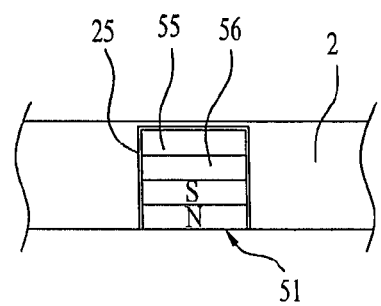
Figure 7:
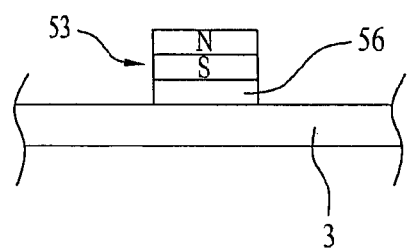

Referring to FIG. 6, if a permanent magnet has a metal of high permeability (Iron, SUS430, SS400, or so on) positioned at the N pole or the S pole of the permanent magnet, it has been verified that magnetic force of the magnetic pole without the metal positioned thereto increases, experimentally.

That is, though the magnetic force of the N pole and the S pole of a bar shaped magnet is 295 mT and 287 mT respectively, if the metal is positioned at the S pole, it is noticed that the magnetic force of the N pole increases to 330 mT, and the magnetic force of the S pole decreases to 97 mT. It is determined that, even though the increased magnetic force of the N pole is smaller than a case of the increased magnetic force when two magnets are placed together, the increased magnetic force of the N pole is useful for increasing the magnetic force of the N pole of one magnet.

In the meantime, it is noticed that, if the metal is positioned at the S pole of the button shaped magnet, the magnetic force of the N pole increases to 500 mT from 463 mT, and the magnetic force of the S pole decreases to 245 mT from 462 mT.

Therefore, the magnetic force amplifiers 56 in FIGS. 5A to 5C are means for amplifying the repulsive force acting between the drum 3 and the tub 2 by using a phenomenon (A function of the pole piece) noticed in FIG. 6. The magnetic force amplifier 56 may be provided to each of the first tub magnetic substance 51 and the first drum magnetic substance 53.

That is, referring to FIG. 5A, one of the magnetic force amplifiers 56 may be fixedly secured to the first tub magnetic substance 51 to position between the cabinet 1 and the tub 2, and the other one of the magnetic force amplifiers 56 may be positioned between the first drum magnetic substance 53 and the outside circumferential surface of the drum 3.

Since above structures will increase the magnetic force of the first magnetic pole (N pole) of the first tub magnetic substance 51 and the magnetic force of the first magnetic pole (N pole) of the first drum magnetic substance 53, a more stable levitated state of the drum 3 provided to the present invention can be maintained within the tub 2.

And, since the magnetic force amplifiers 56 respectively reduce the magnetic force emitting from the second magnetic pole (S pole) of the first tub magnetic substance 51 and the magnetic force emitting from the second magnetic pole (S pole) of the first drum magnetic substance 53, the magnetic force amplifiers 56 can prevent electronic elements in the laundry treating apparatus from malfunctioning by the magnetic force of the circumferential supporter H.

And, the magnetic force amplifiers 56 may also be means for preventing metallic material at the clothes from attaching to the inside circumferential surface of the drum 3 owing to the first drum magnetic substance 53.

In the meantime, the magnetic force amplifiers 56 may be provided in a mode shown in FIG. 5B or 5C.

That is, the magnetic force amplifier 56 provided to the drum 3 may be secured to the outside circumferential surface of the drum 3 to support the first drum magnetic substance 53, and the magnetic force amplifier 56 provided to the tub 2 may be provided to the inside circumferential surface or insert hole 25 of the tub 2 to support the first tub magnetic substance 51 (See FIG. 5B or 5C).

Though FIGS. 5A to 5C illustrate structures in which the drum 3 is levitated within the tub 2 by the repulsive force of the N poles of the first tub magnetic substance 51 and the first drum magnetic substance 53, the drum 3 may be provided to levitate within the tub 2 by the repulsive force of the S poles.

FIGS. 7A~7C illustrate schematic views of circumferential supporters H in accordance with another preferred embodiment of the present invention, having both a vibration damper 55 and a magnetic force amplifier 56 provided thereto, additionally.

Though FIGS. 7A~7C illustrate exemplary cases in which the magnetic force amplifier 56 is provided both to the first tub magnetic substance 51 and the first drum magnetic substance 53, and the vibration damper 55 is provided only to the first tub magnetic substance 51, the vibration damper 55 may also be provided to the first drum magnetic substance 53.

Referring to FIG. 7A, the magnetic force amplifier 56 and the vibration damper 55 may be provided stacked on a surface of the first tub magnetic substance 51 to face the cabinet 1 in above order.

Or, referring to FIGS. 7B and 7C, the magnetic force amplifier 56 may be provided secured to the vibration damper 55 secured to the inside circumferential surface or the insert hole 25 of the tub, and the first tub magnetic substance 51 may be provided secured to the magnetic force amplifier 56.

In any case, it is preferable that the first drum magnetic substance 53 is secured to the circumferential surface of the drum by the magnetic force amplifier 56 secured to the circumferential surface of the drum 3.

The longitudinal supporter L, which makes the front side 38 and the rear side 39 of the drum to maintain fixed gaps from the front side 28 and the rear side 29 of the tub, may also fixedly secured to the tub and the drum with a structures shown in FIGS. 4A~4C, 5A~5C, and 7A~7C.

That is, the longitudinal supporter L may also include the vibration damper and the magnetic force amplifier, and structures in which the tub front magnetic substance 571 and the drum front magnetic substance 573 of the longitudinal supporter L are fixedly secured to the front side of the tub and the front side of the drum respectively and structures in which the tub rear magnetic substance 581 and the drum rear magnetic substance 583 of the longitudinal supporter L are fixedly secured to the rear side of the tub and the rear side of the drum respectively may be provided in structures shown in FIGS. 4A~4C, 5A~5C, and 7A~7C.

Figure 8:
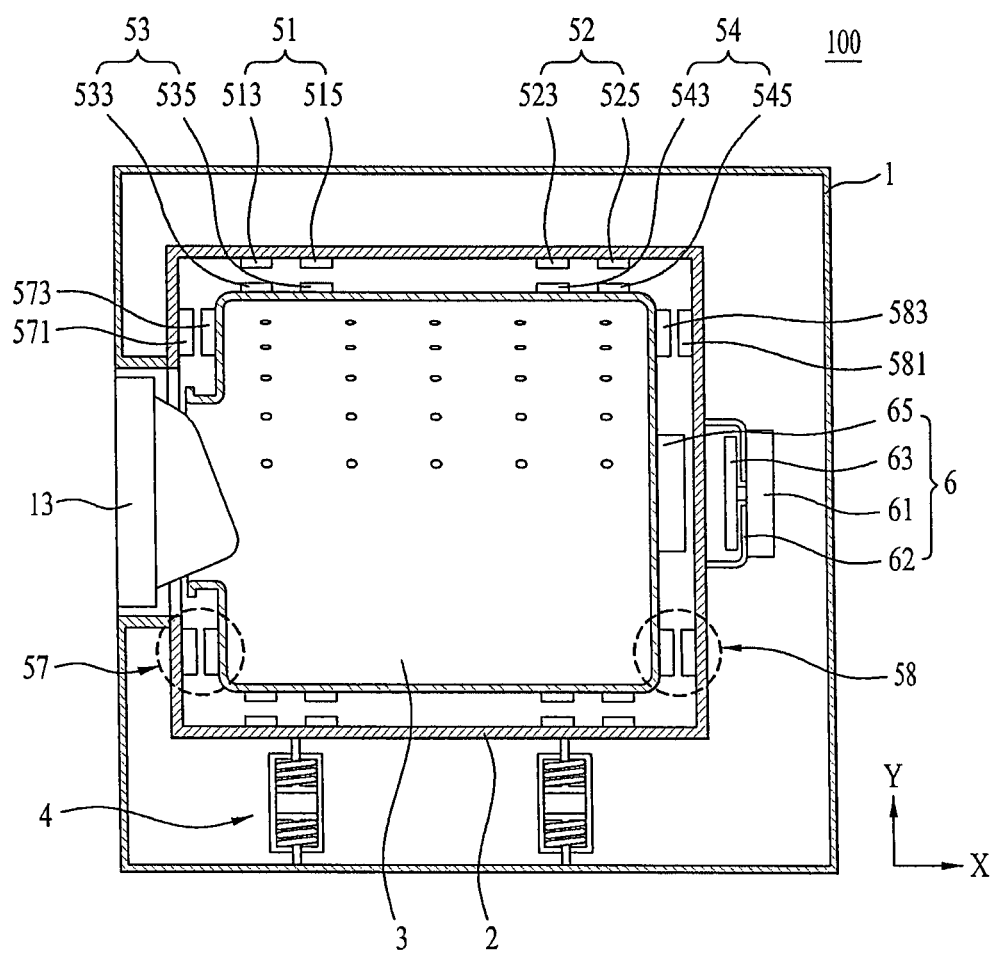
FIGS. 8, 9A, and 9B illustrate schematic views of structures of drum supporters (Circumferential supporters) provided to a laundry treating apparatus in accordance with another preferred embodiment of the present invention, respectively.

FIG. 8 illustrates a schematic view of a circumferential supporter 51, 52, 53, and 54 provided to a laundry treating apparatus in accordance with another preferred embodiment of the present invention, including at least one of a tub magnetic substance 51 and 52, and a drum magnetic substance 53 and 54 constructed of one pair of permanent magnets.

That is, referring to FIG. 8, the circumferential supporter may be provided to include the tub magnetic substance constructed only of a first tub magnetic substance 51 only of two or more than two permanent magnets and a second tub magnetic substance 52 only of two or more than two permanent magnets, or to include the drum magnetic substance constructed only of a first drum magnetic substance 53 only of two or more than two permanent magnets and a second tub magnetic substance 54 only of two or more than two permanent magnets.

However, the circumferential supporter will be described, which includes the first tub magnetic substance 51, the second tub magnetic substance 52, the first drum magnetic substance 53, and the second tub magnetic substance 54, each constructed of one pair of the permanent magnets for conveniences's sake.

The circumferential supporter is provided to include the first tub magnetic substance 51, the second tub magnetic substance 52, the first drum magnetic substance 53, and the second tub magnetic substance 5, each constructed of one pair of the permanent magnets, for utilizing a property of the permanent magnet in which a number of lines of magnetic force increases if one permanent magnet is divided into at least two permanent magnets for enhancing the repulsive force between the tub magnetic substance and the drum magnetic substance.

If one magnet (A bar shaped, or a hexahedral shaped) of a certain thickness is divided into two permanent magnets, the permanent magnet divided into two thus becomes to have a total surface area increased by sectional areas (Two sectional areas) compared to the one permanent magnet.

Since the permanent magnet has lines of magnetic force each emitting from the surface of the S pole to the surface of the N pole, if one permanent magnet is divided into two magnets, the total surface area from which the lines of magnetic force emits increases (An increase of the lines of the magnetic force). And, if the lines of magnetic force increased thus are concentrated in one direction (By using pole pieces, or the like), since density of the lines of the magnetic force increases, the magnetic force in a particular direction increases.

Therefore, the tub magnetic substance may include the first tub magnetic substance 51 of at least one pair of permanent magnets 513 and 515, and the second tub magnetic substance 52 of at least one pair of permanent magnets 523 and 525 spaced a predetermined distance from the first tub magnetic substance 51 in a length direction (x-axis direction) of the tub 2.

That is, the first tub magnetic substance 51 may be constructed of a first permanent magnet 513 and a second permanent magnet 515 positioned at the front side of the tub spaced from each other in the length direction of the tub 2, and the second tub magnetic substance 52 may be constructed of a first permanent magnets 523 and a second permanent magnet 525 positioned at the rear side of the tub spaced from each other in the length direction of the tub 2.

In this case, it is preferable that the permanent magnets 513, 515, and 523, 525 respectively provided to the first tub magnetic substance 51 and the second tub magnetic substance 52 are secured to the tub such that surfaces thereof except secured surfaces are exposed.

That is, it is preferable that each of the permanent magnets 513, 515, 523, and 525 of the first tub magnetic substance 51 and the second tub magnetic substance 52 is provided to the inside circumferential surface of the tub 2 or the outside circumferential surface of the tub 2 to be projected therefrom to expose opposite sides thereof (Sides perpendicular to the length direction of the tub 2).

Figure 9:
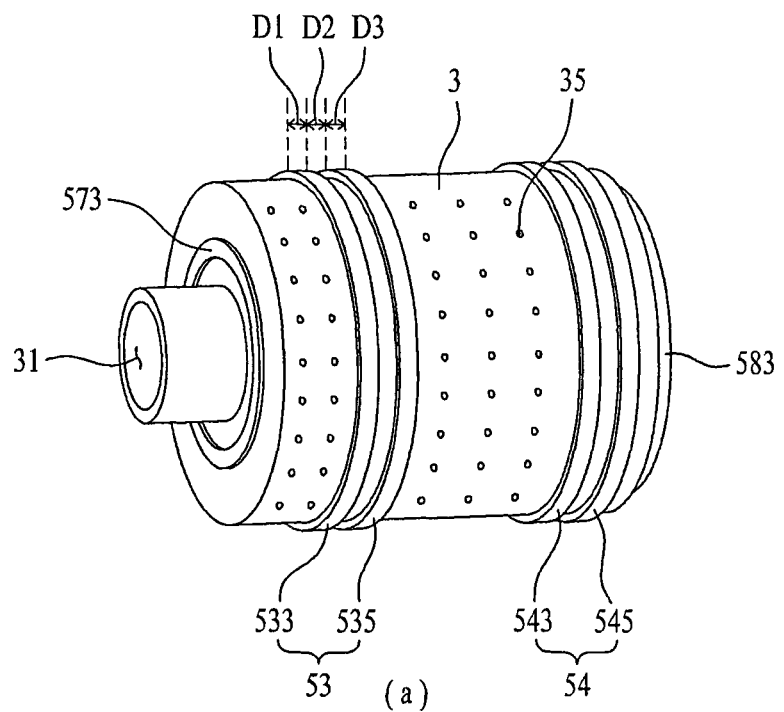
Figure 9:
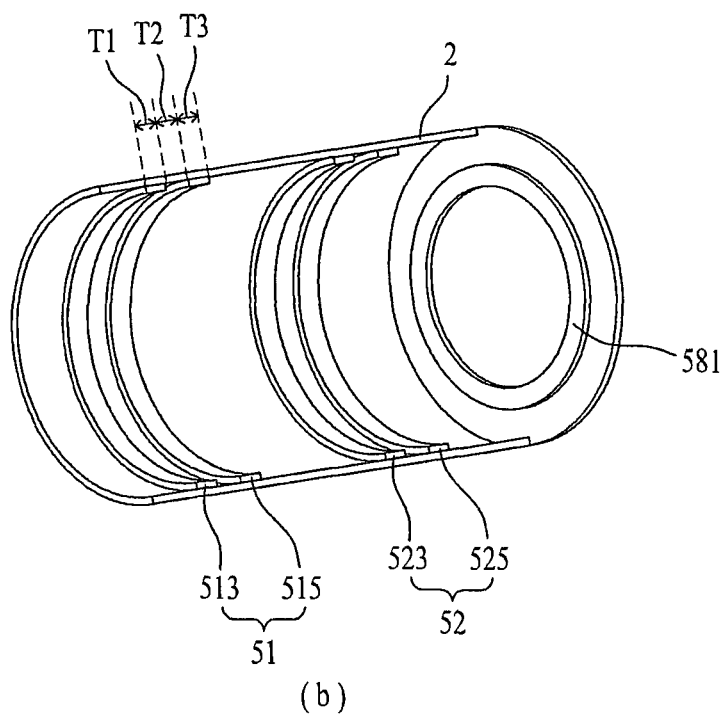

Moreover, referring to FIG. 9B, it is preferable that a width T1 of each of the first permanent magnets 513 and 523 and a width T3 of each of the second permanent magnets 515 and 525 of the tub magnetic substance are provided to be the same with each other, and the first permanent magnets 513 and 523 and the second permanent magnets 515 and 525 are spaced from one another by the width of the permanent magnet (T1=T3=T2).

According to a result of an experiment, when permanent magnets of the same widths are provided spaced by the width of the permanent magnet, the repulsive force to the drum magnetic substance 53 and 54 can be maximized, and even if the drum 3 floats in the length direction of the tub 2, the drum can be supported, securely.

Referring to FIG. 9A, the drum magnetic substance 53 and 54 may also include a first drum magnetic substance 53 of at least one pair of permanent magnets 533 and 535, and a second drum magnetic substance 54 of at least one pair of permanent magnets 543 and 545 spaced a predetermined distance from the first drum magnetic substance 53 in the length direction of the drum 3.

That is, the first drum magnetic substance 53 may include a first permanent magnet 533 and a second permanent magnet 535 provided to face the permanent magnets 513 and 515 of the first tub magnetic substance 51, and the second drum magnetic substance 54 may include a first permanent magnet 543 and a second permanent magnet 545 provided to face the permanent magnets 523 and 525 of the second tub magnetic substance 52.

It is preferable that each of the permanent magnets 533, 535, and 543, 545 of the first drum magnetic substance 53 and the second drum magnetic substance 54 respectively is provided to the outside circumferential surface of the drum 3 to be projected therefrom to expose opposite sides thereof.

Moreover, it is preferable that a width D1 of each of the first permanent magnets 533 and 533 and a width D3 of each of the second permanent magnets 535 and 545 of the drum magnetic substance are provided to be the same with each other, and the first permanent magnets 533 and 543 and the second permanent magnets 535 and 545 are spaced from one another by the width of the permanent magnet (D1=D3=D2).

If both of the tub magnetic substance 51 and 52 and the drum magnetic substance 53 and 54 are constructed of one pair of permanent magnets of the same widths spaced by the width of the permanent magnet, the drum 3 can be supported securely even if positions of the tub magnetic substance and the drum magnetic substance are not matched when the drum 3 rotates (Even if the positions of the tub magnetic substance and the drum magnetic substance are not matched in the length direction of the tub 2).

In the meantime, different from ones shown in the drawings, while each of the first tub magnetic substance 51 and the second tub magnetic substance 52 is constructed of one pair of the permanent magnets, each of the first drum magnetic substance 53 and the second drum magnetic substance 54 may be constructed of one permanent magnet.

In this case, it is preferable that each of the drum magnetic substances 53 and 54 is provided to have a width which is larger than a sum of the width T1 of the first permanent magnet 533, the width T3 of the second permanent magnet 535, and a spaced distance T2 of the first permanent magnet and the second permanent magnet.

This is for supporting the drum 3 securely when the drum 3 floats in the length direction of the tub 2.

Of course, while each of the first tub magnetic substance 51 and the second tub magnetic substance 52 is constructed of one permanent magnet, each of the first drum magnetic substance 53 and the second drum magnetic substance 54 may be constructed of one pair of the permanent magnets.

In this case, it is preferable that a width of each of the tub magnetic substances 51 and 52 is larger than a sum of the width D1 of the first permanent magnet 533, the width D3 of the second permanent magnet 535 of the drum magnetic substance, and a spaced distance D2 between the first permanent magnetic, and the second permanent magnet.

In the meantime, the first tub magnetic substance 51, the second tub magnetic substance 52, the first drum magnetic substance 53, and the second drum magnetic substance 54 may be fixedly secured to the circumferential surface of the tub 2 and the circumferential surface of the drum 3 in structures shown in FIGS. 4A~4C, 5A~5C, and 7A~7C, respectively.

Especially, if the magnetic force amplifier 56 is provided to each of the permanent magnets 513, 515, 523, 525, 533, 535, 543, and 545, enabling to concentrate the lines of magnetic force in a direction the magnetic force amplifier is not provided, above described effect will be maximized.

Figure 10:
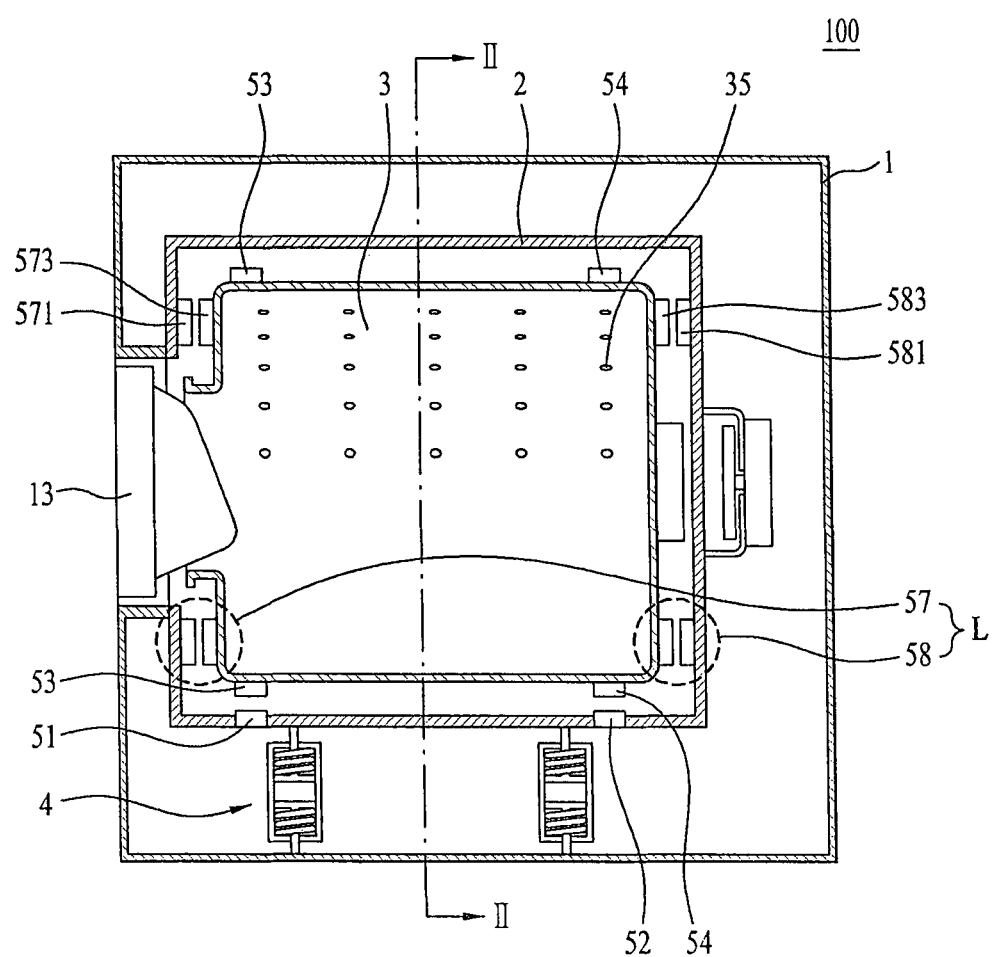

FIG. 10 illustrates a schematic view of a tub magnetic substance in accordance with another preferred embodiment of the present invention, characterized in that the magnetic force of the tub magnetic substance 51 and 52 positioned above the drum 3 is larger than the magnetic force of the tub magnetic substance 51 and 52 positioned below the drum 3.

This is because the repulsive force of the magnetic substances is required to be concentrated below a horizontal line A which passes through the rotation axis F of the drum parallel to a bottom surface of the cabinet 1 (A floor surface the cabinet is supported thereon) for levitating the drum 3 within the tub 2 by using the repulsive force between the tub magnetic substance 51 and 52 and the drum magnetic substance 53 and 54.

For this, the tub magnetic substance 51 and 52 may be provided in modes shown in FIGS. 11A~11D. Since structures of the first tub magnetic substance 51 and the second tub magnetic substance 52 may be provided identical, the structures will be described with reference to the structure of the first tub magnetic substance 51.

Figure 11:
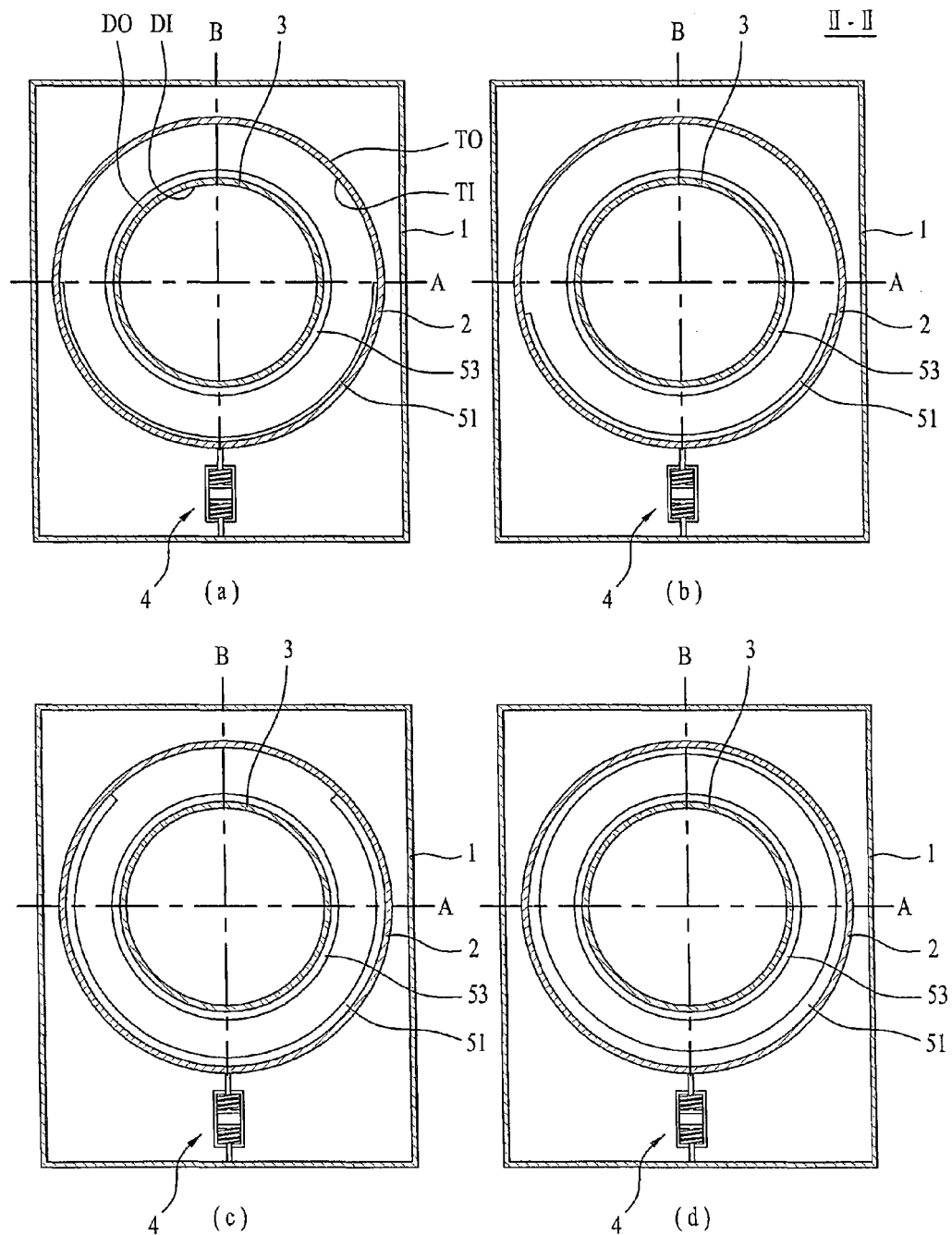

FIG. 11A illustrates a schematic view of a case the first tub magnetic substance 51 is provided in a bar shaped permanent magnet positioned under the horizontal line A.

If the first tub magnetic substance 51 is provided to the inside circumferential surface TO of the tub 2, the first tub magnetic substance 51 will have a length the same with a circumferential length of the tub positioned under the horizontal line A.

FIG. 11B illustrates a schematic view of a case in which the first tub magnetic substance is provided in a bar shaped permanent magnet having a length shorter than a circumferential length of the tub 2 positioned below the horizontal line A.

In this case, it is preferable that the first tub magnetic substance 51 is provided to position below the horizontal line A symmetric with respect to a vertical line B passing through the rotation axis F of the drum vertical to the bottom of the cabinet 1.

FIG. 11C illustrates a schematic view of a case in which the first tub magnetic substance 51 is provided, not only to the entire circumferential surface of the tub positioned below the horizontal line, but also a region of the circumferential surface of the tub 2 positioned above the horizontal line A.

While FIGS. 11A to 11C are characterized in that the tub magnetic substance 51 is not provided to a region of the circumferential surface of the tub 2 positioned above the drum 3 (A region of the circumferential surface of the tub positioned over the horizontal line), FIG. 11D is characterized in that the first tub magnetic substance 51 positioned below the drum 3 has a thickness thicker than a thickness of the first tub magnetic substance 51 positioned over the drum 3.

That is, referring to FIG. 11D, the first tub magnetic substance 51 may be provided such that the thickness of the first tub magnetic substance 51 becomes the thicker as the first tub magnetic substance 51 goes from the upper side of the drum 3 to the lower side of the drum 3 (Goes from the upper side of the horizontal line to the lower side of the horizontal line) the more.

In the meantime, the first tub magnetic substance may be provided such that a plurality of permanent magnets are stacked on the circumferential surface of the tub 2 to have the magnetic force of the first tub magnetic substance positioned above the drum 3 stronger than the magnetic force of the first tub magnetic substance positioned below the drum 3.

Above will be described with reference to FIG. 12A. The first tub magnetic substance 51 may include a first permanent magnet 513 provided to the circumferential surface of the tub 2 positioned below the drum 3 to be symmetric with reference to the vertical line B, and a second permanent magnet 515 extended upward toward the upper side of the tub 2 from both ends of the first permanent magnet 513 to have a thickness thinner than a thickness of the first permanent magnet.

Different from this, the first tub magnetic substance 51 may include a second permanent magnet 515 secured to the circumferential surface of the tub 2, and a first permanent magnet 513 secured to an upper side of the second permanent magnet 515.

In this case, it is required that the first permanent magnet 513 and the second permanent magnet 515 may be provided to the circumferential surface of the tub 2 positioned below the drum 3 in symmetry with reference to the vertical line B, and the second permanent magnet 515 may be provided to an entire circumferential surface of the tub 2, or the entire circumferential surface of the tub except a region of the circumferential surface of the tub 2 positioned above the drum 3.

In the meantime, the first tub magnetic substance 51 may include a third permanent magnet 517 extended from both ends of the second permanent magnetic substance 515 toward the upper side of the tub 2 with a thickness thinner than the second permanent magnet 515.

Figure 12:
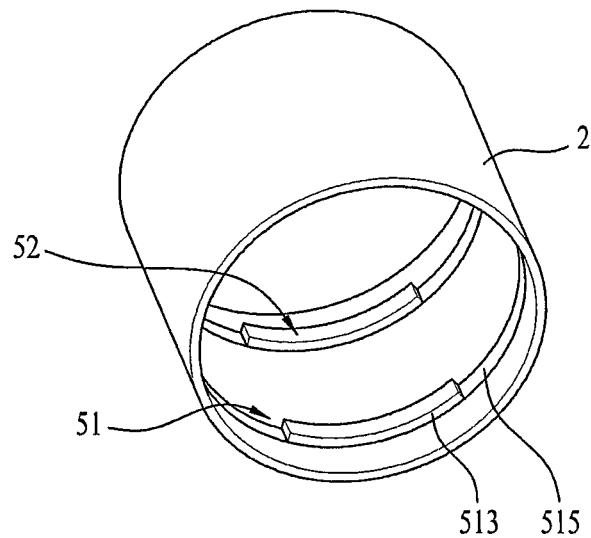
Figure 12:
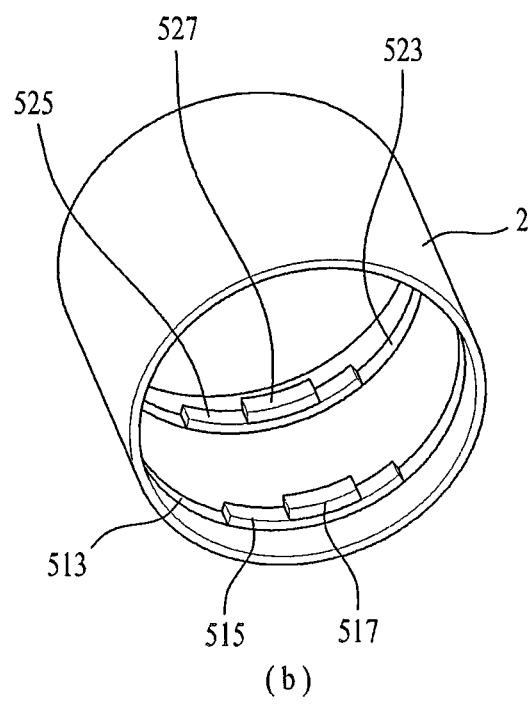
Figure 13:
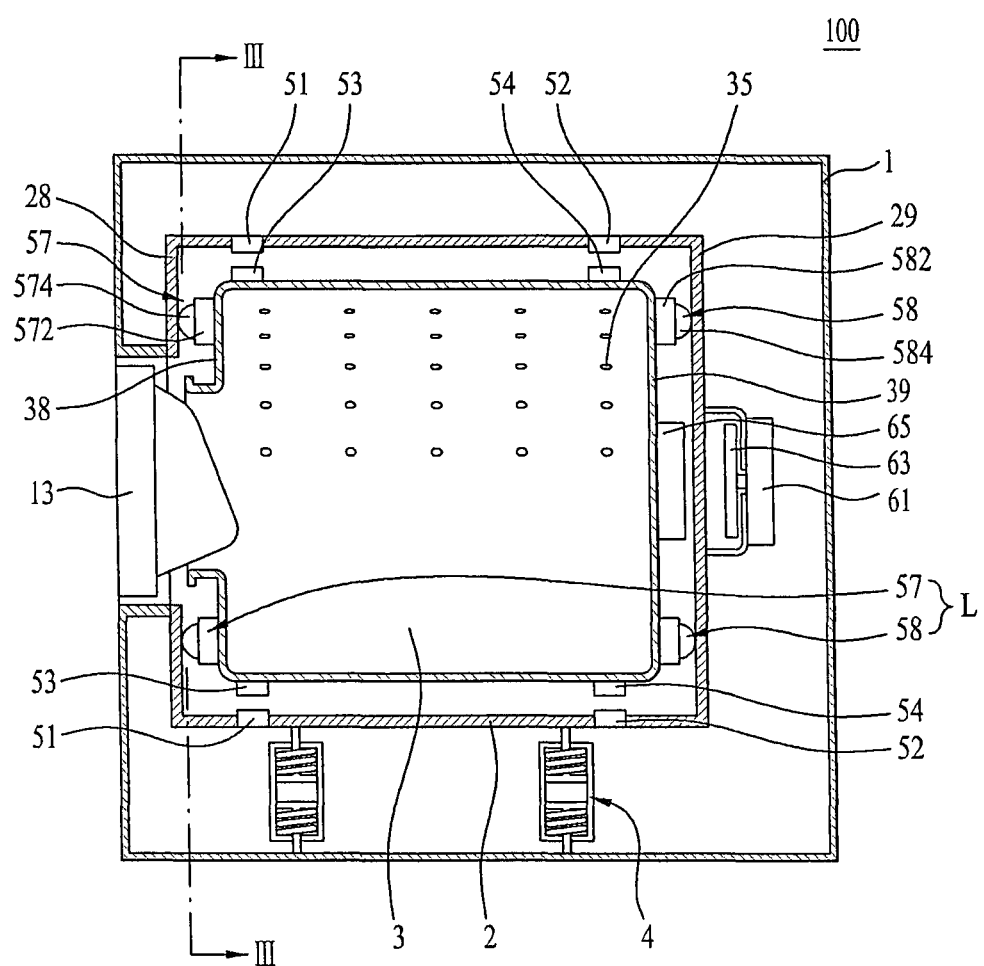

However, referring to FIG. 12B, the first tub magnetic substance 51 may include a first permanent magnet 513 secured to the circumferential surface of the tub 2, a second permanent magnet 515 secured to an upper side of the first permanent magnet 513, and a third permanent magnet 517 secured to an upper side of the second permanent magnet.

In this case, it is preferable that the first permanent magnet 513 is provided to the entire circumferential surface of the tub 2, or the entire circumferential surface of the tub 2 except a region of the circumferential surface of the tub 2, and the second permanent magnet 515 and the third permanent magnet 517 is provided stacked on the first permanent magnet 513 to have a length of the second permanent magnet 515 longer than a length of the third permanent magnet 517.

Moreover, it is preferable that the permanent magnets 513, 515, and 517 are provided to be symmetry with reference to the vertical line B.

In the meantime, the tub magnetic substance 51 and 52 may also be fixedly secured to the circumferential surface of the tub 2 in structures shown in FIGS. 4A to 4C, 5A to 5C, and 7A to 7C.

Moreover, it is preferable that the magnetic force of the permanent magnets 513, 515, and 517 is set such that the rotation axis F of the drum coincides with the rotation shaft 615 of the motor.

Though the front supporter 57 and the rear supporter 58 of the present invention may be provided such that the front side and the rear side of the drum 3 can maintain fixed gaps to the front side and the rear side of the tub 2 respectively, the front supporter 57 and the rear supporter 58 of the present invention may also be provided such that the front side 38 and the rear side 39 of the drum 3 can maintain fixed gaps to the front side 28 and the rear side 29 of the tub 2 respectively in structures shown in FIGS. 13 to 15B.

Referring to FIG. 14A, a longitudinal supporter L includes a housing 572 secured to the tub or the drum, a ball 574 rollably provided to the housing, and a ball supporter 576 in the housing for supporting the ball 574.

The ball 574 is rollable owing to the ball supporter 576, and prevented from falling off the housing 572 by a ball falling off preventive piece 578.

The longitudinal supporter L may be provided only to the front side 38 and the rear side 39 of the drum 3, or only to the front side 28 and the rear side 29 of the tub 2.

Referring to FIG. 14B, if the longitudinal supporter L is provided only to the front side and the rear side of the drum, it is preferable that a plurality of the housings 531 are provided to each of the front side and the rear side of the drum 3 spaced predetermined distances from one another.

Moreover, the ball 574 at the front side 38 of the drum 3 may be provided to be in contact with the front side 28 of the tub 2, and the ball 574 at the rear side 39 of the drum 3 may be provided to be in contact with the rear side 29 of the tub 2.

However, if the longitudinal supporter L is provided only to the front side and the rear side of the tub, it is required that the ball 574 positioned at the front side of the tub 2 may be in contact with the front side of the drum, and the ball 574 positioned at the rear side of the tub 2 may be in contact with the rear side of the drum 3.

Since the ball 574 is rollably provided to the housing 572, the ball 574 enables the front side and the rear side of the drum 3 to maintain fixed gaps to the front side and the rear side of the tub 2 respectively, even if the drum 3 vibrates in a length direction of the tub 2.

Figure 14:
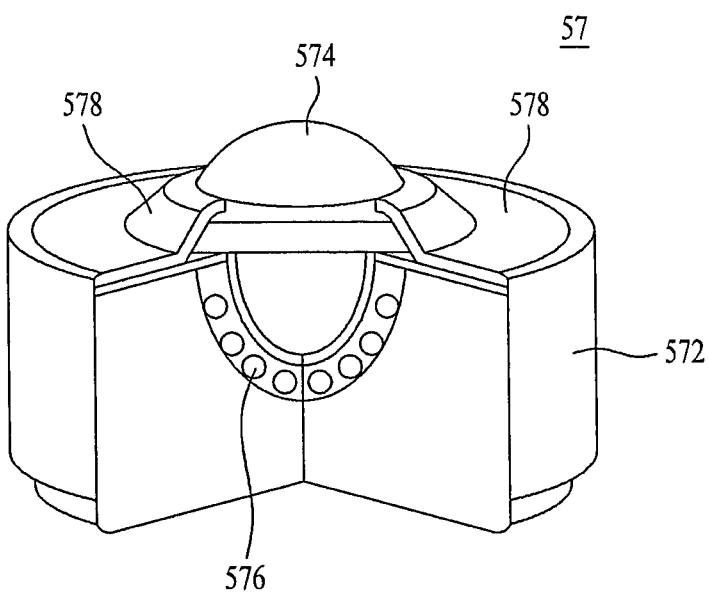
Figure 14:
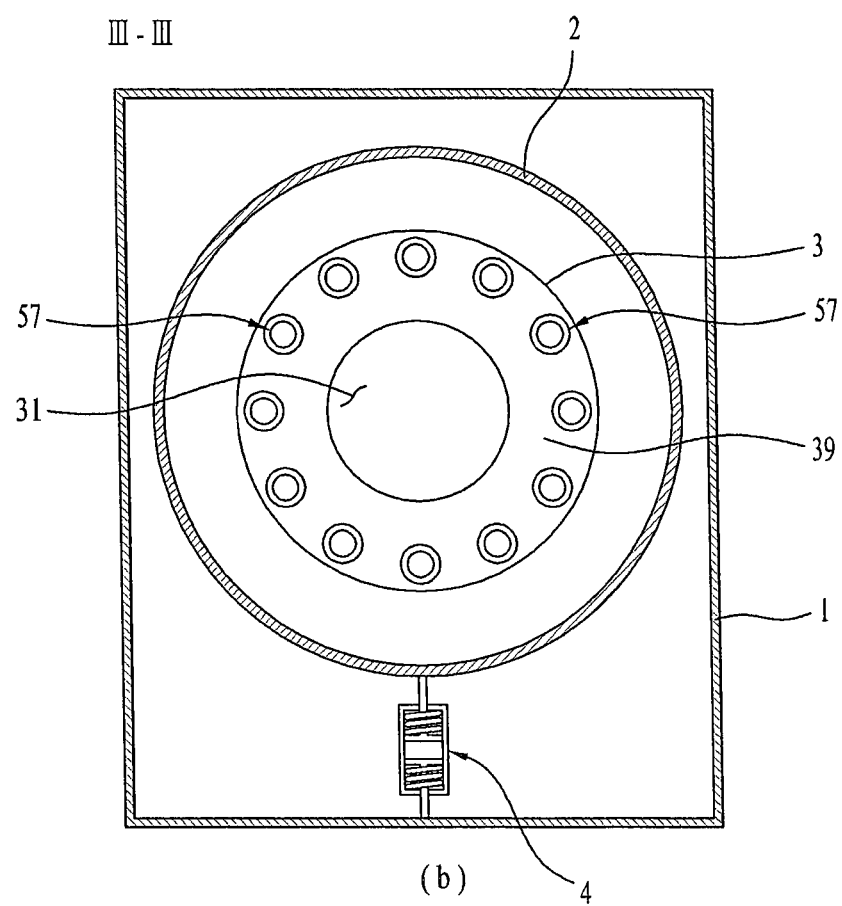
Figure 15:
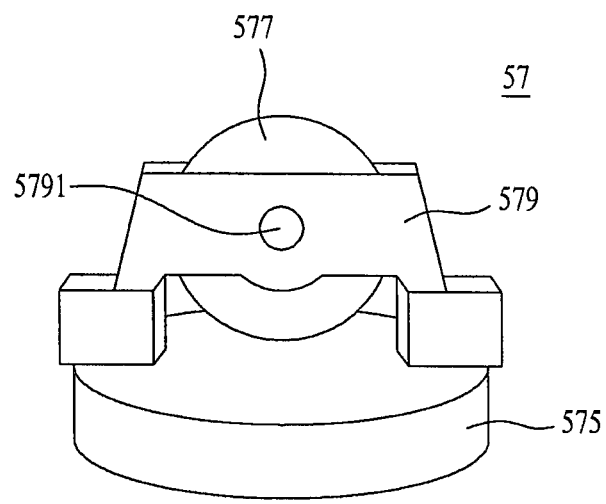
Figure 15:
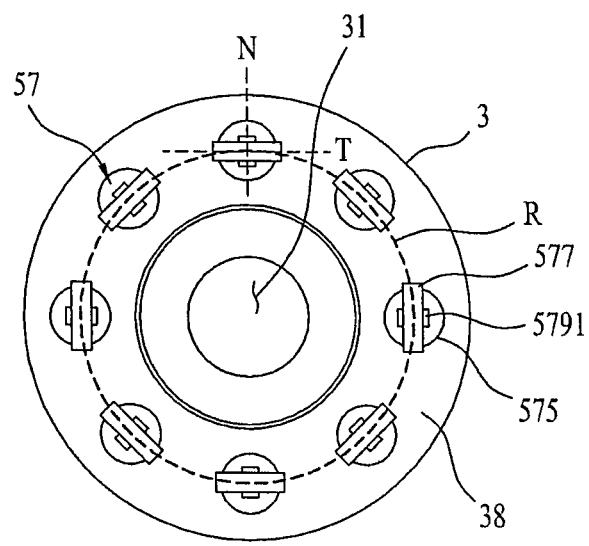

Though the longitudinal supporter L illustrated in FIG. 14 shows a case in which the ball 574 is held by the housing 572 secured to the drum or the tub, the longitudinal supporter L of the present invention may be the ball 574, only. In this case, it is required that the ball 574 is rollably provided either to the drum or the tub so as to be in contact with rest of the tub and the drum.

FIGS. 15A and 15B illustrate schematic views of a longitudinal supporter L in accordance with another preferred embodiment of the present invention, including a supporter base 575, a roller retainer 579 provided to the supporter base, and rollers 577 rotatably provided to the roller retainer 579.

The roller retainer 579 is means for securing the rollers 577 to the supporter base 575, and the rollers 577 are rotatably coupled to the roller retainer 579 with roller shafts 5791, respectively.

Referring to FIG. 15B, though the supporter base 575 may be fixedly secured to the drum 3, the supporter base 575 may also be fixedly secured to the tub 2.

If the supporter base 575 is secured to the outside circumferential surface of the drum 3, the rollers 577 positioned at the front side of the drum are provided to be in contact with the front side of the tub 2, and the rollers 577 positioned at the rear side of the drum are provided to be in contact with the rear side of the tub 2.

It is required that the rollers 577 are provided not to interfere with rotation of the drum 3. FIG. 15B illustrates a case in which the rollers 577 are provided parallel to a tangential line T of the rotation locus R of the drum, as an example.

In this case, the roller shafts 5791 will be provided in a direction of a normal line N of the rotation locus R of the drum.

It is preferable that a plurality of the supporter bases 575 are provided in the circumferential direction of the drum spaced at predetermined distances.

Though the longitudinal supporter L in FIGS. 15A and 15B illustrate a case in which the rollers 577 are rotatably provided to the supporter base 575 fixedly secured to the drum or the tub, the longitudinal supporter L of the present invention may be the rollers 577 only.

In this case, it is preferable that the rollers 577 are rotatably provided either to the drum or the tub so as to be in contact with rest of the tub and the drum.

FIGS. 16A and 16B illustrate schematic views of the drum driving unit 6 provided to a laundry treating apparatus in accordance with a preferred embodiment of the present invention, including a motor 61 provided to the rear side of the tub 2, a first driving unit magnetic substance 63 secured to the rotation shaft 615 of the motor 61, and a second driving unit magnetic substance 65 secured to the drum 3 housed in the first driving unit magnetic substance 63.

Figure 17:
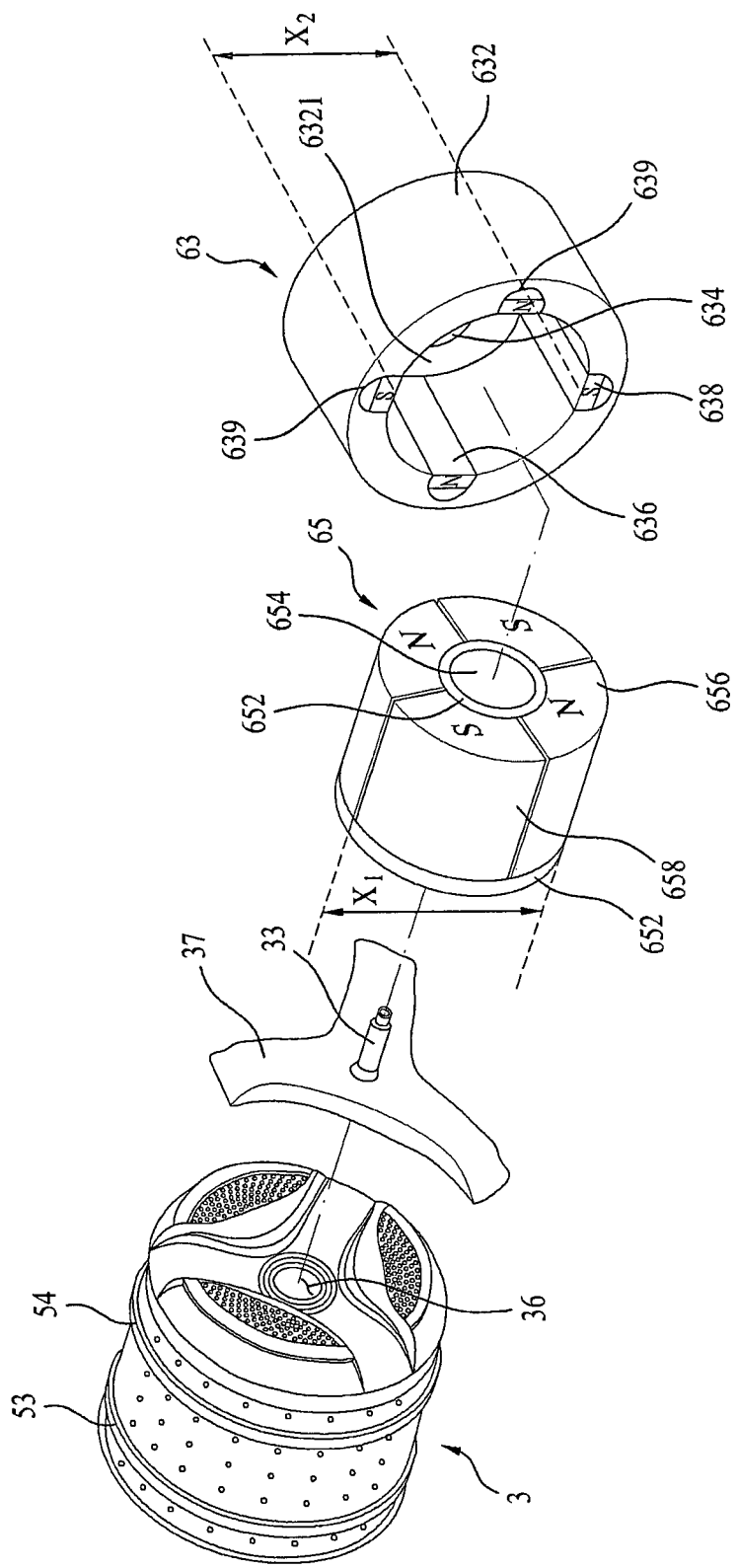

Referring to FIG. 17, the first driving unit magnetic substance 63 may include a first cylindrical body 632 having a coupling surface 6321, a first magnet 636 provided to an inside circumferential surface of the first body 632 to expose either the N pole or the S pole, and a second magnet 638 secured to the inside circumferential surface of the first body 632 to expose a magnetic pole different from the first magnet.

The first magnet 636 and the second magnet 638 are provided arranged to the inside circumferential surface of the first body 632, alternately.

In this case, the rotation shaft 615 of the motor 61 may be secured to the first body 632 through a first fastening hole 634 provided to the coupling surface 6321, and the first body 632 may have receiving recesses 639 each of which is a groove in the inside circumferential surface of the first body 67 for receiving the first magnet 636 and the second magnet 638 therein, respectively.

The second driving unit magnetic substance 65 may include a second cylindrical body 652 secured to the drum 3 to be received in the first body 632, a third magnet 658 provided to an outside circumferential surface of the second body 652 to have a magnetic pole different from the first magnet 636, and a fourth magnet 656 provided to an outside circumferential surface of the second body 652 to have a magnetic pole different from the second magnet 638.

If an arm 37 is fixedly secured to the rear side of the drum 3 for easy transmission of the rotation force of the motor 61 to the drum 3, the second body 652 may have a center provided with a second fastening hole 654 for inserting and securing the rotation shaft 33 of the drum thereto.

In the embodiment, the first driving unit magnetic substance 63 and the second driving unit magnetic substance 65 of the magnetic coupler C can not be separated with the rear side 29 of the tub disposed therebetween.

Therefore, in the embodiment, it is required that both of the first driving unit magnetic substance 63 and the second driving unit magnetic substance 65 of the magnetic coupler C are positioned in the tub as shown in FIG. 16A, or both of the first driving unit magnetic substance 63 and the second driving unit magnetic substance 65 of the magnetic coupler C are positioned on an outside of the tub 2.

If the first driving unit magnetic substance 63 and the second driving unit magnetic substance 65 are positioned in the tub 2, the rotation shaft 615 of the motor 61 will couple to the first driving unit magnetic substance 63 passed through the rear side 29 of the tub, and, if the first driving unit magnetic substance 63 and the second driving unit magnetic substance 65 are positioned on the outside of the tub 2, the rotation shaft 33 of the drum will couple to the second driving unit magnetic substance 65 passed through the rear side 29 of the tub.

In a view that the motor rotation shaft 615 or the drum rotation shaft 33 is provided passed through the rear side 29 of the tub, a configuration of the embodiment is liable to transmit vibration from the drum to the tub, which is comparable to configurations of the foregoing embodiments.

However, referring to FIG. 16A, if a difference of an inside circumferential diameter X1 of the first driving unit magnetic substance 63 and an outside circumferential diameter X2 of the second driving unit magnetic substance 65 is set to have a dimension enough to take a maximum vibration amplitude of the drum 3, the embodiment can also separate the tub 2 from the vibration system of the laundry treating apparatus.

Figure 16:
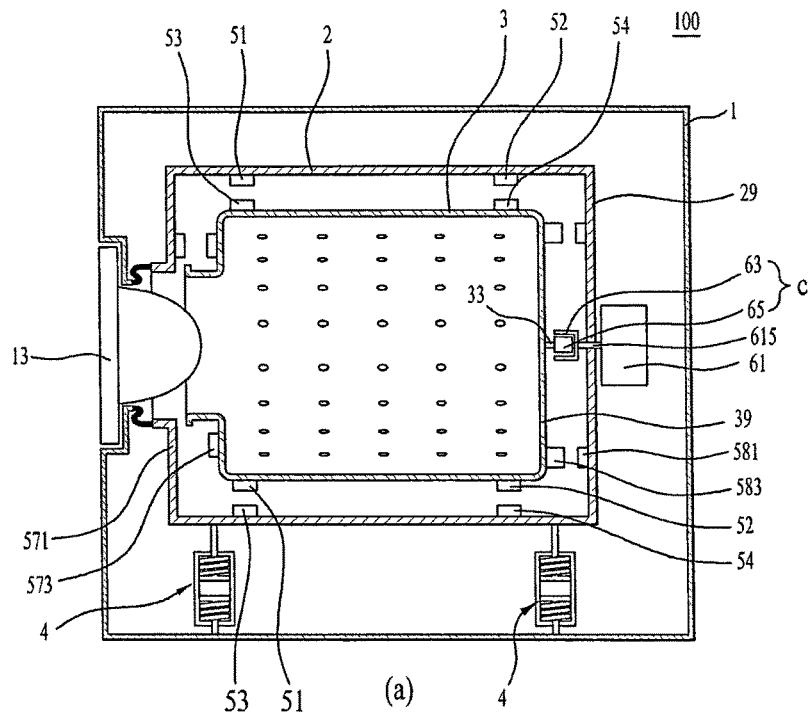
FIGS. 16A, 16B, and 17 illustrate schematic views of drum driving units provided to a laundry treating apparatus in accordance with a preferred embodiment of the present invention, respectively.
Figure 16:
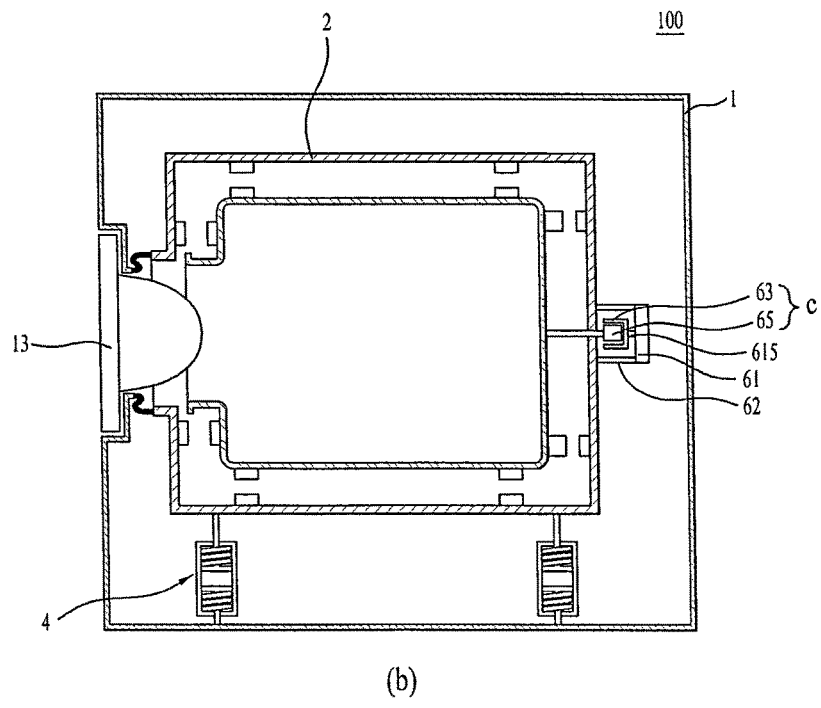

In the meantime, different from FIG. 16, the first driving unit magnetic substance 63 may be secured to the drum 3, and the second driving unit magnetic substance 65 may be secured to the rotation shaft 615 of the motor.

The present invention (Application number KR10-2012-0042708) provides a laundry treating apparatus including a cabinet having an introduction opening for introduction and taking out laundry, a tub in the cabinet having a tub opening in communication with the introduction opening, a drum in the tub having a drum opening in communication with the tub opening for holding the laundry, and a drum supporter for levitating the drum within the tub with repulsive force between a magnetic substance provided to the tub and a magnetic substance provided to the drum.

The drum supporter may include a tub magnetic substance provided along a circumferential surface of the tub, and a drum magnetic substance provided along a circumferential surface of the drum to have the repulsive force provided thereto from the tub magnetic substance.

The tub magnetic substance may be provided along the circumferential surface of the tub discontinuously, and the drum magnetic substance may be provided along the circumferential surface of the drum, continuously.

The drum supporter may further include a vibration damper positioned between the tub magnetic substance and an inside circumferential surface of the tub for providing elastic force to the tub magnetic substance.

The drum supporter may further include a magnetic force amplifier for increasing the repulsive force between the tub magnetic substance and the drum magnetic substance, wherein the magnetic force amplifier may include a metal positioned between the tub magnetic substance and the inside circumferential surface of the tub, and a metal positioned between the drum magnetic substance and an outside circumferential surface of the drum.

The drum supporter may further include a vibration damper positioned between the inside circumferential surface of the tub and the tub magnetic substance for providing elastic force to the tub magnetic substance, and the magnetic force amplifier for increasing the repulsive force between the tub magnetic substance and the drum magnetic substance.

The laundry treating apparatus of the present invention further includes a tub supporter provided between the tub and the cabinet for supporting the tub, wherein the tub supporter may include a cylinder, an upper rod secured to the tub, an upper piston secured to the upper rod to position in the cylinder, an upper coil in the cylinder for magnetizing the upper piston either with an N pole or an S pole when a current supplied thereto, a lower rod secured to the cabinet, a lower piston secured to the lower rod to position in the cylinder, and a lower coil in the cylinder for magnetizing the lower piston to have a magnetic pole identical to the upper piston when the current is supplied thereto.

The laundry treating apparatus of the present invention may further include a drum driving unit including a motor positioned on an outside of the tub, a first driving unit magnetic substance coupled to a rotation shaft of the motor to position on an outside of the tub, and a second driving unit magnetic substance coupled to the drum to position in the tub for rotating with attractive force or repulsive force the first driving unit magnetic substance provides thereto.

The present invention (Application number KR10-2013-0005303) provides a laundry treating apparatus including a cabinet, a tub in the cabinet having a tub opening in communication with the introduction opening, a cylindrical drum rotatably provided in the tub having a drum opening in communication with the tub opening for holding laundry, a drum magnetic substance provided along a circumferential surface of the drum, and a tub magnetic substance provided along a circumferential surface of the tub for levitating the drum within the tub with repulsive force with respect to the drum magnetic substance, wherein at least one of the drum magnetic substance and the tub magnetic substance is constructed of at least one pair of permanent magnets provided spaced a predetermined distance from each other.

The tub magnetic substance may be at least one pair of permanent magnets provided to an inside circumferential surface of the tub or an outside circumferential surface of the tub to be projected therefrom spaced a predetermined distance in a length direction of the tub from each other.

The one pair of permanent magnets provided to the tub magnetic substance may have widths the same with each other, and the permanent magnets adjacent to each other may be provided spaced by the width of the permanent magnet in a length direction of the tub.

The drum magnetic substance may be provided in one permanent magnet provided along the circumferential surface of the drum, and the drum magnetic substance may have a width larger than a sum of widths of one pair of the permanent magnets provided to the tub magnetic substance and a spaced distance between the permanent magnets.

The drum magnetic substance may be provided to be projected from the outside circumferential surface of the drum, and may be provided in at least one pair of permanent magnets spaced a predetermined distance from each other in a length direction of the drum.

The one pair of the permanent magnets provided to the drum magnetic substance may have widths the same with each other, and the permanent magnets adjacent to each other may be provided spaced by the width of the permanent magnet in a length direction of the drum.

In this case, the tub magnetic substance may be provided in one permanent magnet provided along the circumferential surface of the tub, and the tub magnetic substance may have a width larger than a sum of widths of one pair of the permanent magnets provided to the drum magnetic substance and a spaced distance between the permanent magnets.

In the meantime, the drum magnetic substance may be provided in at least one pair of permanent magnets provided spaced a predetermined distance in the length direction of the drum from each other, and the tub magnetic substance may be provided in at least one pair of permanent magnets provided spaced a predetermined distance in the length direction of the tub from each other.

The tub magnetic substance may include a first tub magnetic substance and a second tub magnetic substance provided to the circumferential surface of the tub spaced from each other in the length direction of the tub, wherein the first tub magnetic substance may include at least one pair of permanent magnets provided along the circumferential surface of the tub spaced from each other in the length direction of the tub, and the second tub magnetic substance may include at least one pair of permanent magnets provided along the circumferential surface of the tub spaced from each other in the length direction of the tub.

And, the drum magnetic substance may include a first drum magnetic substance and a second drum magnetic substance provided to the circumferential surface of the drum spaced from each other in the length direction of the drum, wherein the first drum magnetic substance may include at least one pair of permanent magnets provided along the circumferential surface of the drum spaced from each other in the length direction of the drum, and the second drum magnetic substance may include at least one pair of permanent magnets provided along the circumferential surface of the drum spaced from each other in the length direction of the drum.

The laundry treating apparatus of the present invention may further include a vibration damper provided to the inside circumferential surface of the tub for supporting the tub magnetic substance, elastically.

The laundry treating apparatus of the present invention may further include a magnetic force amplifier provided to include at least one of a metal provided between the vibration damper and the tub magnetic substance, and a metal provided to the outside circumference of the drum for securing the drum magnetic substance to the drum.

The laundry treating apparatus of the present invention may further include a rear supporter for making a rear side of the drum to maintain a fixed gap to a rear side of the tub, and a front supporter for making a front side of the drum to maintain a fixed gap to a front of the tub.

The present invention (Application number KR10-2013-0005302) provides a laundry treating apparatus, including a cabinet having an introduction opening, a tub in the cabinet having a tub opening, a cylindrical drum rotatably provided in the tub to have a drum opening for holding laundry, a drum magnetic substance provided to a circumferential surface of the drum, and a tub magnetic substance provided to the tub for levitating the circumferential surface of the drum within the tub with repulsive force to the drum magnetic substance, wherein the magnetic force of the tub magnetic substance positioned below the drum is stronger than the magnetic force of the tub magnetic substance positioned above the drum.

The tub magnetic substance may be provided only to a region of the circumferential surface of the tub.

The tub magnetic substance may be provided to the circumferential surface of the tub positioned below a horizontal line passing a rotation axis of the drum parallel to ground the cabinet is supported thereon.

The tub magnetic substance may be a bar shaped permanent magnet secured to the circumferential surface of the tub positioned below the horizontal line.

The tub magnetic substance may be symmetric with reference to a vertical line passing the rotation axis of the drum vertical to ground the cabinet is supported thereon, to have a length shorter than a length of the circumference of the tub positioned below the horizontal line.

The tub magnetic substance may be provided to a region of the tub positioned above the horizontal line passing the rotation axis of the drum parallel to ground the cabinet is supported thereon, and to an entire circumference of the tub positioned below the horizontal line.

The tub magnetic substance may be provided along the circumferential surface of the tub, wherein a thickness of the tub magnetic substance positioned below the drum is thicker than a thickness of the tub magnetic substance positioned above the drum.

The tub magnetic substance may be a bar shaped permanent magnet provided along the circumferential surface of the tub, with a thickness which becomes the thicker as the tub magnetic substance goes from an upper side of the drum toward a lower side of the drum the more.

The tub magnetic substance may be symmetric with reference to a vertical line passing the rotation axis of the drum vertical to ground the cabinet is supported thereon, and may include a first permanent magnet positioned below the drum, and a second permanent magnet extended from both ends of the first permanent magnet along the circumference of the tub to have a thickness thinner than a thickness of the first permanent magnet.

The present invention (Application number KR10-2012-0121165) provides a laundry treating apparatus, including a cabinet having an introduction opening for putting in, and taking out laundry therethrough, a tub in the cabinet having a tub opening, a cylindrical drum rotatably provided in the tub to have a drum opening for holding laundry, a circumferential supporter for levitating a circumferential surface of the drum within the tub with repulsive force between a permanent magnet provided to the tub and a permanent magnet provided to the drum, and a longitudinal supporter for maintaining gaps between the tub and the drum in a length direction of the tub, and rotatably supporting the drum.

The laundry treating apparatus of the present invention may further include a first driving unit magnetic substance rotatably provided to an outside of the tub, and a second driving unit magnetic substance secured to the drum for rotating the drum by attractive force the first driving unit magnetic substance provides thereto.

The longitudinal supporter may include a front side supporter provided to either a front side of the drum or a front side of the tub for maintaining a gap between the front side of the drum and the front side of the tub and rotatably supporting the front side of the drum, and a rear side supporter provided to either a rear side of the drum or a rear side of the tub for maintaining a gap between the rear side of the drum and the rear side of the tub and rotatably supporting the rear side of the drum.

The front supporter may include a housing secured to either the front side of the drum or the front side of the tub, and a ball rollably provided to the housing to be in contact with rest of the front side of the drum and the front side of the tub, and the rear supporter may include a housing secured to either the rear side of the drum or the rear side of the tub, and a ball rollably provided to the housing to be in contact with rest of the rear side of the drum and the rear side of the tub.

The front supporter may include a supporter base secured to either the front side of the drum or the front side of the tub, and a roller rollably provided to the supporter base to be in contact with rest of the front side of the drum and the front side of the tub, and the rear supporter may include a supporter base secured to either the rear side of the drum or the rear side of the tub, and a roller rollably provided to the supporter base to be in contact with rest of the rear side of the drum and the rear side of the tub.

The roller in the front supporter may be plural provided to either the front side of the drum or the front side of the tub along the circumferential direction of the drum, and the roller in the rear supporter may be plural provided to either the rear side of the drum or the rear side of the tub along the circumferential direction of the drum, wherein the rollers of the front supporter and the rear supporter may be provided along a tangential line of a rotation locus of the drum.

The longitudinal supporter may be provided in a ball rollably provided to either the front side of the drum or the front side of the tub to be in contact with rest of the front side of the drum and the front side of the tub.

The longitudinal supporter may be provided in a ball rollably secured to either the front side of the drum or the front side of the tub to be in contact with rest of the front side of the drum and the front side of the tub.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A laundry treating apparatus comprising:
   a cabinet having an introduction opening for placing in, and taking out laundry from the cabinet;
   a tub in the cabinet having a tub opening in communication with the introduction opening;
   a drum rotatably provided in the tub and configured to have a drum opening in communication with the tub opening for holding the laundry; and
   a drum supporter for levitating the drum within the tub with repulsive force between a permanent magnet provided to the tub and a permanent magnet provided to the drum,
   wherein the drum supporter includes a circumferential supporter that is configured to levitate the drum within the tub to allow the drum to move in a radial direction in reference to a rotation axis of the drum within the tub, and a longitudinal supporter that is configured to maintain a gap between the drum and the tub formed in a direction along a length of the tub,
   wherein the circumferential supporter comprises:
      a tub magnetic substance constructed of permanent magnets provided along a circumferential surface of the tub,
      a drum magnetic substance constructed of permanent magnets provided to a circumferential surface of the drum to have repulsive force provided to the drum from the tub magnetic substance, and
      a magnetic force amplifier for increasing the repulsive force between the tub magnetic substance and the drum magnetic substance,
   wherein the magnetic force amplifier comprises:
      a metal secured to a circumferential surface of the tub that is configured to support the tub magnetic substance; and
      a metal secured to a circumferential surface of the drum that is configured to support the drum magnetic substance.

2. The laundry treating apparatus as claimed in claim 1, wherein a plurality of the tub magnetic substance is provided along the circumferential surface of the tub, and the drum magnetic substance is provided along the circumferential surface of the drum.

3. The laundry treating apparatus as claimed in claim 1,
   wherein the metal secured to the circumferential surface of the tub is provided on an inside circumferential surface of the tub, and
   wherein the metal secured to the circumferential surface of the drum is provided on an outside circumferential surface of the drum.

4. The laundry treating apparatus as claimed in claim 1, wherein the longitudinal supporter comprises;

a front supporter provided to a front side of the tub having the opening of the tub positioned therein, and a front side of the drum having the opening of the drum positioned therein for maintaining the gap between the front side of the tub and the front side of the drum with the magnetic force, respectively, and a rear supporter provided to a rear side of the tub, and a rear side of the drum for maintaining the gap between the rear side of the tub and the rear side of the drum with the magnetic force, respectively.

5. The laundry treating apparatus as claimed in claim 1, wherein the longitudinal supporter comprises;

a front supporter provided to either the front side of the tub having the opening of the tub positioned therein, or the front side of the drum having the opening of the drum positioned therein for maintaining the gap between the front side of the tub and the front side of the drum and rotatably supporting the front side of the drum, and a rear supporter provided to either the rear side of the tub, or the rear side of the drum for maintaining the gap between the rear side of the tub and the rear side of the drum and rotatably supporting the rear side of the drum.

6. The laundry treating apparatus as claimed in claim 1, wherein the tub magnetic substance includes a first tub magnetic substance and a second tub magnetic substance provided to the inside circumferential surface of the tub or the outside circumferential surface of the tub spaced a predetermined distance from each other, and the drum magnetic substance includes a first drum magnetic substance and a second drum magnetic substance provided to the inside circumferential surface of the drum or the outside circumferential surface of the drum for having the repulsive force provided thereto from the first tub magnetic substance and the second tub magnetic substance.

7. The laundry treating apparatus as claimed in claim 1, further comprising:

a motor positioned on an outside of the tub;

a first driving unit magnetic substance coupled to a rotation shaft of the motor to position on the outside of the tub, and a second driving unit magnetic substance provided in the tub and fixed to a rear side of the drum for rotating the drum with attractive force or repulsive force the first driving unit magnetic substance provides to the second driving magnetic substance.

* * * * *